June 19, 1956 J. L. FERGUSON ET AL 2,750,856

CASE HANDLING APPARATUS

Filed Oct. 28, 1950 16 Sheets-Sheet 1

INVENTORS.
John L. Ferguson
& Richard C. Talbot.
By: Thiess, Olson & Mecklenburger.
Attys.

June 19, 1956 J. L. FERGUSON ET AL 2,750,856

CASE HANDLING APPARATUS

Filed Oct. 28, 1950 16 Sheets-Sheet 2

INVENTORS.

John L. Ferguson & Richard C. Talbot

By: Olson, Olson & Mecklenburger. Attys.

June 19, 1956 J. L. FERGUSON ET AL 2,750,856

CASE HANDLING APPARATUS

Filed Oct. 28, 1950 16 Sheets-Sheet 3

INVENTORS.
John L. Ferguson &
Richard C. Talbot.
By: Thiess, Olson &
Mecklenburger Attys.

June 19, 1956 J. L. FERGUSON ET AL 2,750,856

CASE HANDLING APPARATUS

Filed Oct. 28, 1950 16 Sheets-Sheet 4

INVENTORS.

John L. Ferguson &

Richard C. Talbot.

By: Thiess, Olson & Mecklenburger. Attys.

CASE HANDLING APPARATUS

Filed Oct. 28, 1950 16 Sheets-Sheet 5

INVENTORS
John L. Ferguson,
& Richard C. Talbot.
By: Thiess, Olson & Mecklenburger.
Attys.

CASE HANDLING APPARATUS

Filed Oct. 28, 1950 16 Sheets-Sheet 6

INVENTORS.
John L. Ferguson
& Richard C. Talbot.
By Dheiss, Olson & Mecklenburger.
Attys.

June 19, 1956 J. L. FERGUSON ET AL 2,750,856
CASE HANDLING APPARATUS
Filed Oct. 28, 1950 16 Sheets-Sheet 7

INVENTORS
John L. Ferguson &
Richard C. Talbot.
By: Thiess, Olson & Mecklenburger.
Attys.

June 19, 1956 J. L. FERGUSON ET AL 2,750,856

CASE HANDLING APPARATUS

Filed Oct. 28, 1950 16 Sheets-Sheet 8

INVENTORS.
John L. Ferguson &
Richard C. Talbot.
By: Thiess, Olson & Mecklenburger.
Attys.

June 19, 1956 J. L. FERGUSON ET AL 2,750,856

CASE HANDLING APPARATUS

Filed Oct. 28, 1950 16 Sheets-Sheet 9

INVENTORS.
John L. Ferguson &
Richard C. Talbot.
By: Weiss, Olson & Mecklenburger,
Attys.

June 19, 1956 J. L. FERGUSON ET AL 2,750,856

CASE HANDLING APPARATUS

Filed Oct. 28, 1950 16 Sheets-Sheet 10

INVENTORS
John L. Ferguson &
Richard C. Talbot.
By: Thiess, Olson & Mecklenburger.
Attys.

June 19, 1956 J. L. FERGUSON ET AL 2,750,856

CASE HANDLING APPARATUS

Filed Oct. 28, 1950 16 Sheets-Sheet 11

INVENTORS
John L. Ferguson &
Richard C. Talbot.
By Thiess, Olson & Mecklenburger
Attys.

June 19, 1956 J. L. FERGUSON ET AL 2,750,856

CASE HANDLING APPARATUS

Filed Oct. 28, 1950 16 Sheets-Sheet 12

INVENTORS

John L. Ferguson & Richard C. Talbot.

By Thiess, Olson & Mecklenburger. Attys.

June 19, 1956 J. L. FERGUSON ET AL 2,750,856

CASE HANDLING APPARATUS

Filed Oct. 28, 1950 16 Sheets-Sheet 13

INVENTORS.
John L. Ferguson &
Richard C. Talbot.
By: Thiess, Olson &
Mecklenburger Att'ys.

June 19, 1956 J. L. FERGUSON ET AL 2,750,856

CASE HANDLING APPARATUS

Filed Oct. 28, 1950 16 Sheets-Sheet 14

INVENTORS.
John L. Ferguson &
Richard C. Talbot.
By: Thiess, Olson & Mecklenburger
Attys.

June 19, 1956 J. L. FERGUSON ET AL 2,750,856

CASE HANDLING APPARATUS

Filed Oct. 28, 1950 16 Sheets-Sheet 15

INVENTORS.
John L. Ferguson &
Richard C. Talbot.
By: Thiess, Olson & Mecklenburger.
Attys.

June 19, 1956 J. L. FERGUSON ET AL 2,750,856

CASE HANDLING APPARATUS

Filed Oct. 28, 1950 16 Sheets-Sheet 16

INVENTORS
John L. Ferguson &
Richard C. Talbot.
By: Thiess, Olson & Mecklenburger
Attys.

United States Patent Office 2,750,856

Patented June 19, 1956

2,750,856

CASE HANDLING APPARATUS

John L. Ferguson and Richard C. Talbot, Joliet, Ill., assignors to J. L. Ferguson Company, Joliet, Ill., a corporation of Illinois Application October 28, 1950, Serial No. 192,780

4 Claims. (Cl. 93—53)

This invention relates to a case handling method and apparatus and more particularly to a method and apparatus for opening paper board cases, folding the closing flaps and positioning the case for loading, the method and apparatus being entirely mechanical rather than partially pneumatic. It is an object of the invention to provide an improved method and apparatus of that character.

Cases for receiving cans, boxes and other articles for shipment or storage are conventionally delivered by the manufacturer in flattened or folded condition, with the closing flaps at each end extending outwardly. It is another object of the invention to provide an improved method and apparatus for removing, seriatim, individual cases from a stack of folded cases, opening the cases, folding the closing flaps at one end to closed position, and folding the closing flaps at the other end outwardly in order to better receive the articles to be placed in the carton.

It is another object of the invention to provide an automatic case handling machine of the character indicated which is simple, durable and reliable.

It is another object of the invention to provide an improved method and apparatus for removing seriatim individual folded cases from the bottom of a stack of such cases.

It is another object of the invention to provide an improved method and apparatus for opening folded cases.

According to one embodiment of the invention cases are removed individually and seriatim from the bottom of a stack of folded cases in which each of the cases lies in a substantially horizontal plane. A novel form of bed is provided for supporting the stack of cases in order that the case-removing fingers may reliably remove one, and only one, case from the bottom of the stack at each operational cycle. After removal of the individual folded cases from the stack they are advanced horizontally in a direction parallel to the plane of the folded cases with the closing flaps extending laterally of the direction of motion. A pivoted case opening member forces the lower rear wall of the case forwardly and upwardly. A case straightening member is provided for engaging the forward folded edge of each case and restraining the case from forward motion during the operation of the case opening member. Case holding members restrain the rearward edge of the forward lower wall of the case from upward movement during the operation of the case opening member, and flap spreaders are provided for bending the flaps of each case to form a V-shaped opening for receiving the case holding members.

After the case is thus opened the closing flaps at one end of the case are moved to their closed positions by a series of flap folders and guides while the closing flaps at the other end of the case are operated upon by flap folders and guides to fold such flaps outwardly in order that articles to be placed in the case may more readily be inserted therein.

The invention, together with further objects and advantages thereof, will be best understood by reference to the following description taken in connection with the accompanying drawings, and its scope will be pointed out in the appended claims.

In the drawings, in which like parts are designated by like reference numerals:

Figure 4:
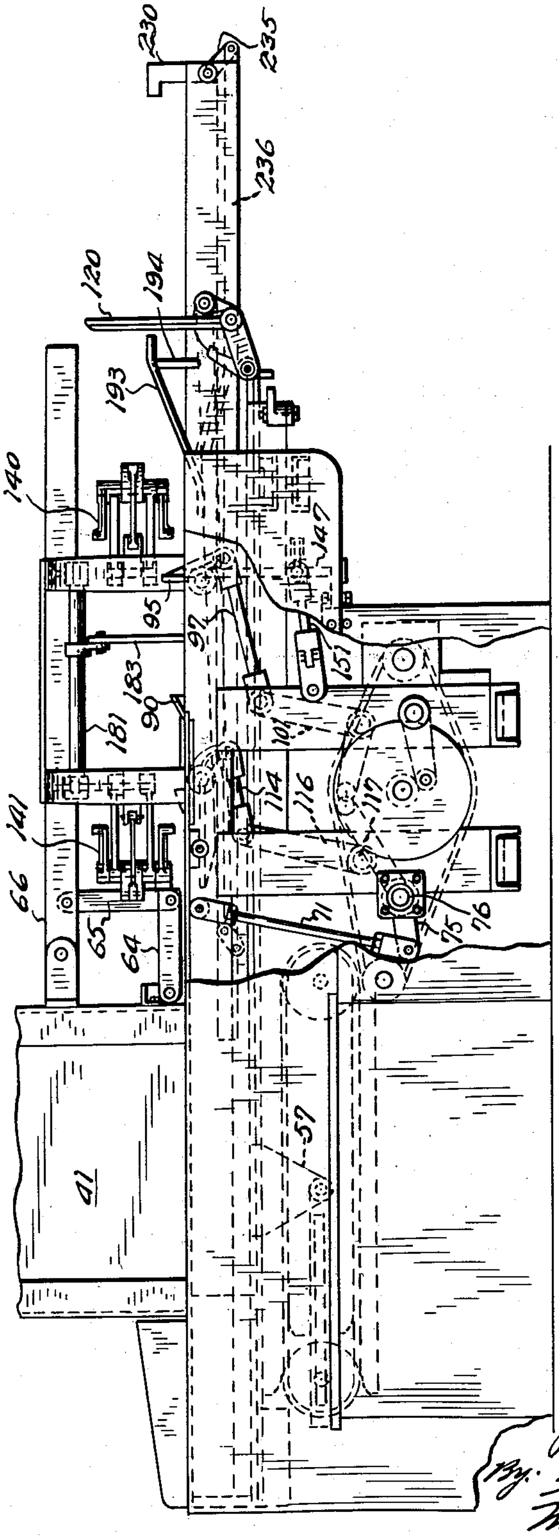
Fig. 4 is a side elevational view of the same machine with certain portions partially broken away.

The case handling machine disclosed in the drawings and described below is arranged to operate on a stack of folded cases and ultimately to present the cases seriatim to a case-loading machine in condition to receive cans, cartons or other articles which are to be loaded therein. The cases 40 are arranged in folded condition in a magazine 41, best seen in Figs. 1 and 4. In the illustrated embodiment of the invention the individual cartons lie in horizontal planes in a vertical stack. The top of the magazine 41, which does not appear in the drawings, is preferably open to receive fresh supplies of folded cases as the stack is depleted.

Within the magazine the stack of cases is supported on a pair of symmetrically arranged rails 42 seen in Figs. 2, 3, 5, 13, and 27. As will be best seen in Figs. 13 and 27 the rails 42 are depressed near the center of the magazine 41 with the result that the cartons 40 near the bottom of the stack are bowed convexly downward for reasons which will subsequently be explained.

Figure 25:
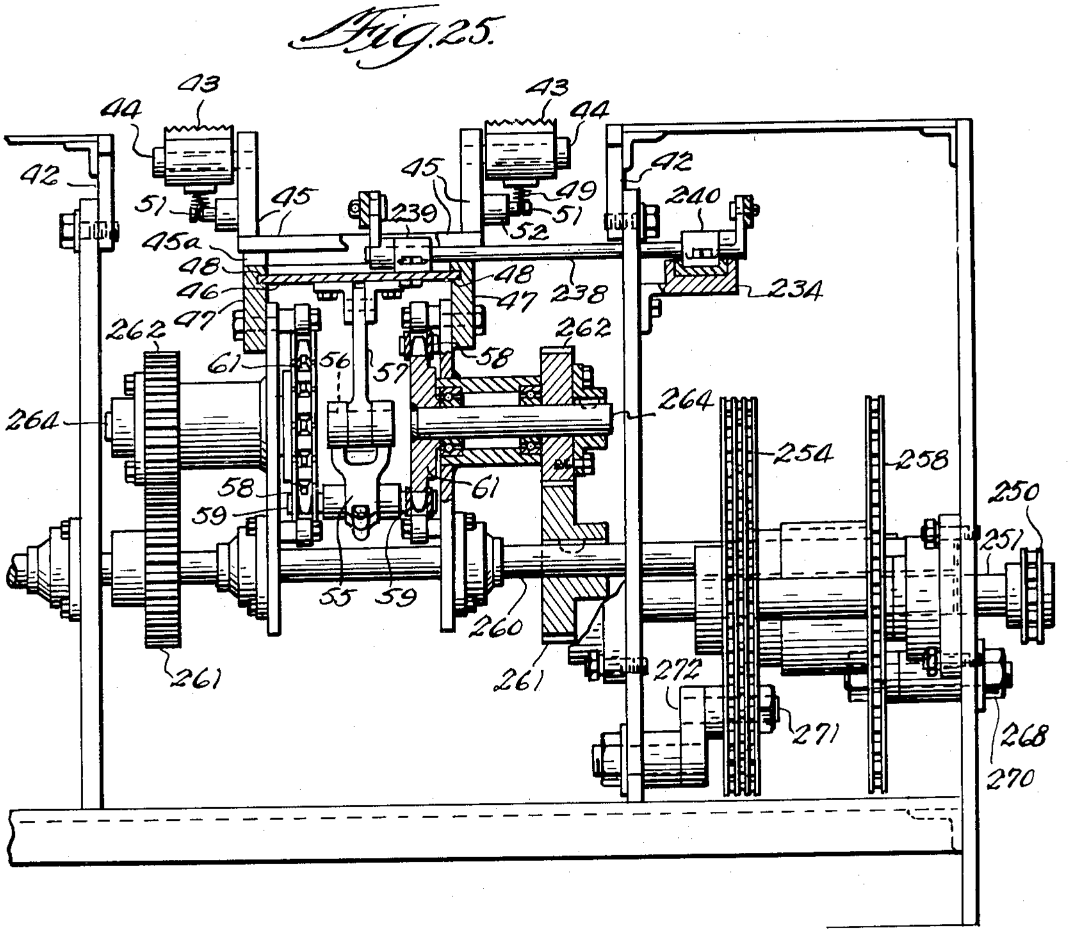
Fig. 25 is an enlarged cross-sectional view taken along the line 25—25 of Fig. 24.

Case feeding apparatus is provided for removing the lowermost folded case from the stack of cases contained in the magazine. This apparatus includes a pair of dogs 43 each having a serrated forward edge in order that they may better grip the rearward folded edge of the lowermost case 40 in the magazine 41. Each of the dogs 43 is pivotally mounted on a fixed stub shaft 44 as is best seen in Fig. 25. The shafts 44 are secured to the sides of a box-like structure 45 which is in turn mounted on an elongated sliding plate 46 but elevated slightly thereabove by a plurality of pads 45*a*, best seen in Figs. 25 and 27.

The elongated sliding plate 46 is arranged to slide with respect to a pair of fixed rails 47, each of these rails having a groove 48 for receiving the lateral edges of the sliding plate 46. Means for driving the sliding plate 46 in a reciprocatory motion will be described subsequently.

Figures 13, 14:
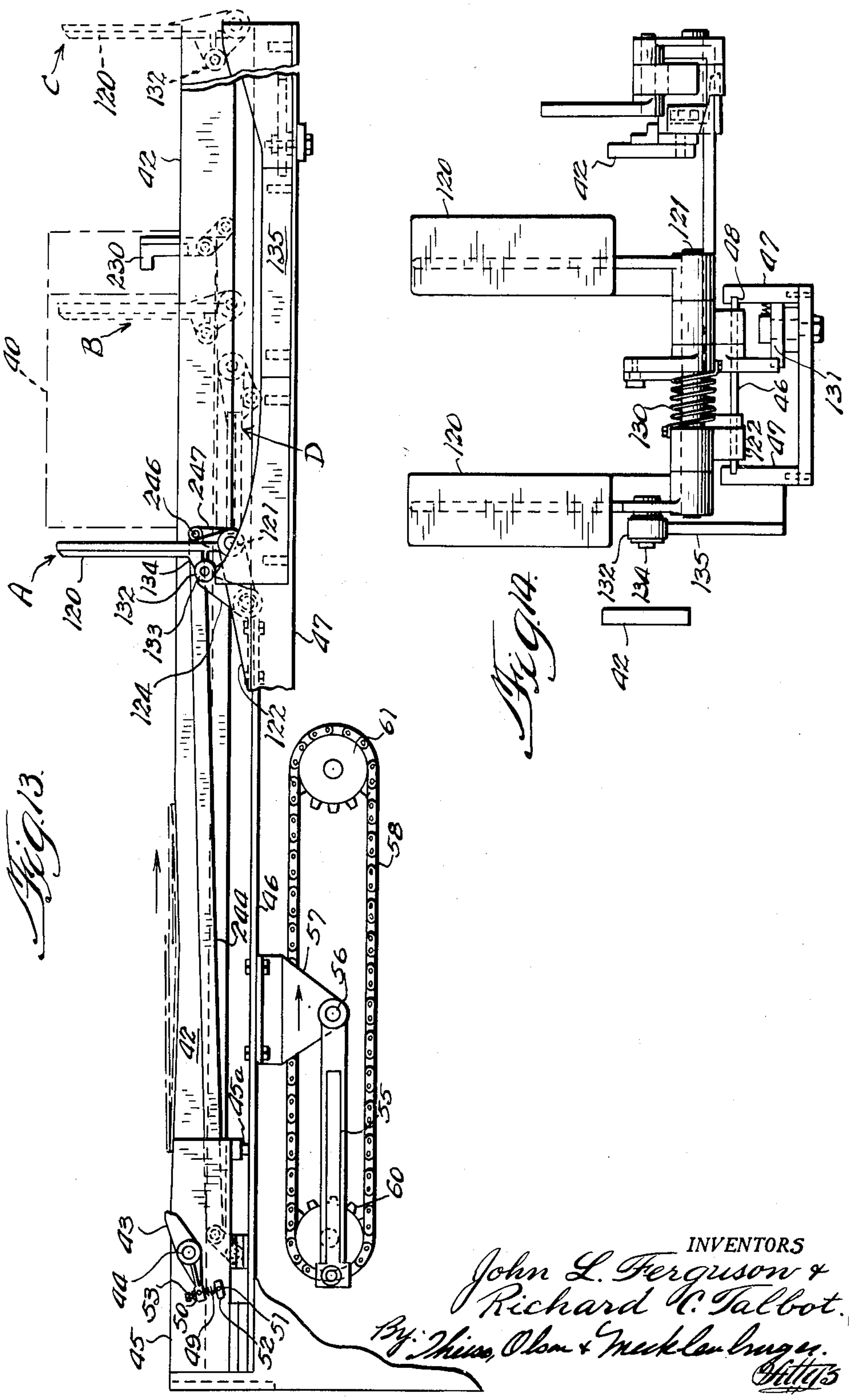
Fig. 13 is a cross-sectional view of the apparatus shown in Fig. 3 taken along the line 13—13 of that figure.
Fig. 14 is an enlarged, end elevational view of the apparatus shown in Fig. 13.
Figure 27:
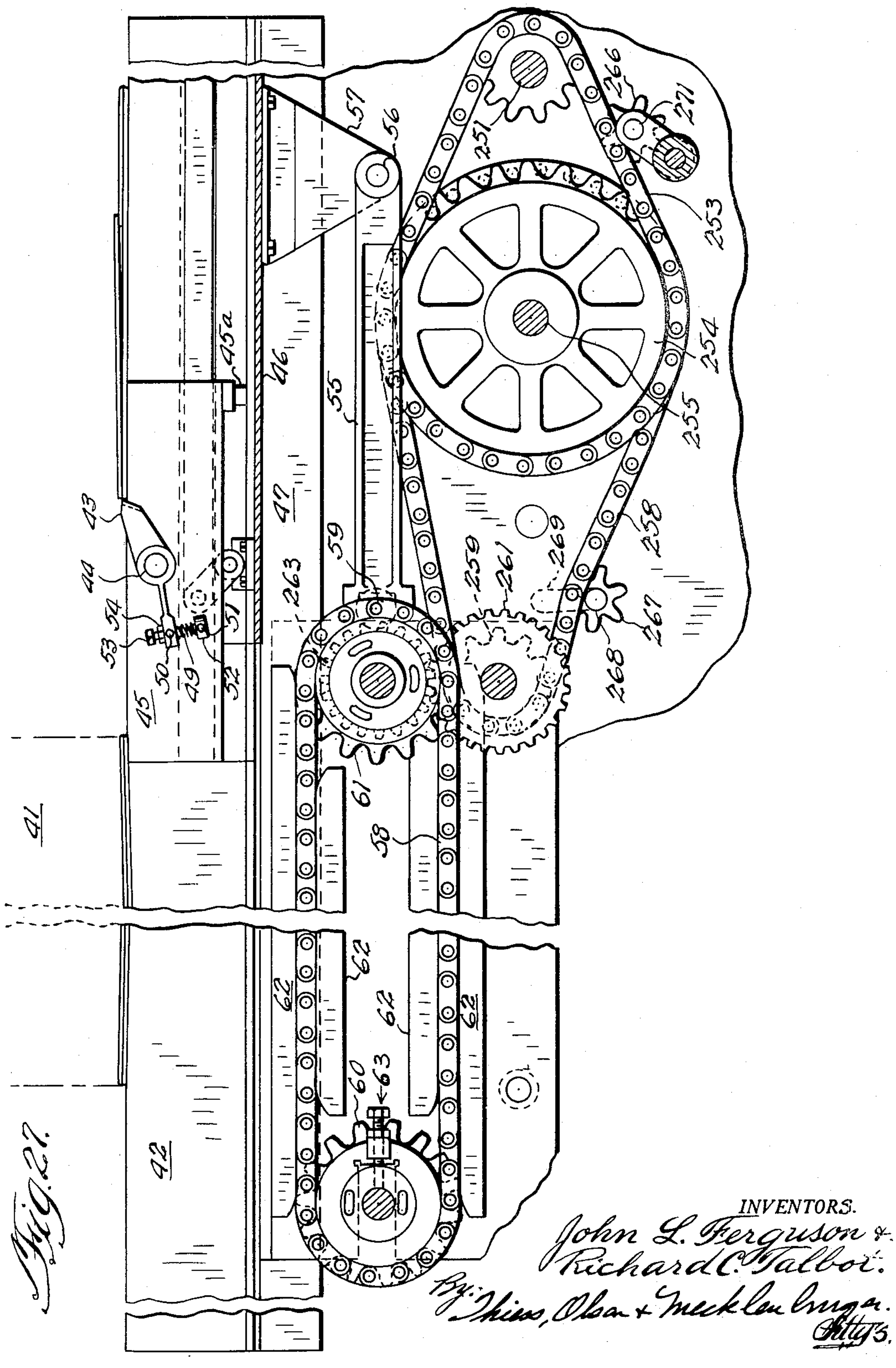
Fig. 27 is an enlarged cross-sectional view taken along the line 27—27 of Fig. 24; and, Figs. 28–32 are schematic perspective drawings illustrating various operations performed on a case by the same case handling machine.

As is best seen in Figs. 13 and 27 each of the dogs 43 is urged in a counterclockwise direction, as viewed in those figures, by a tension spring 49 whose ends are secured to a pair of pins 50 and 51, the pin 50 extending laterally from the rearward end of the dog 43 and the pin 51 extending laterally from a block 52 secured to one side wall of the box-like structure 45. The springs 49, then, urge the forward, serrated, case-engaging edges of the dogs 43 upwardly to case-engaging position.

An adjustable screw 53 is threadedly engaged with the rearward end of each of the dogs 43 and its lower end is arranged to strike the block 52 as the dog pivots upwardly. The upward or case-engaging position of the dog 43 may thereby be determined by adjustment of the screw 53, and a lock nut 54 is provided for securing the screw 53 in its properly adjusted position. It will now be apparent that the dogs 43 are limited as to their motion in a counterclockwise direction by the screw 53 but may be forced downwardly or in a clockwise direction against the urging of the springs 49.

Figure 5:
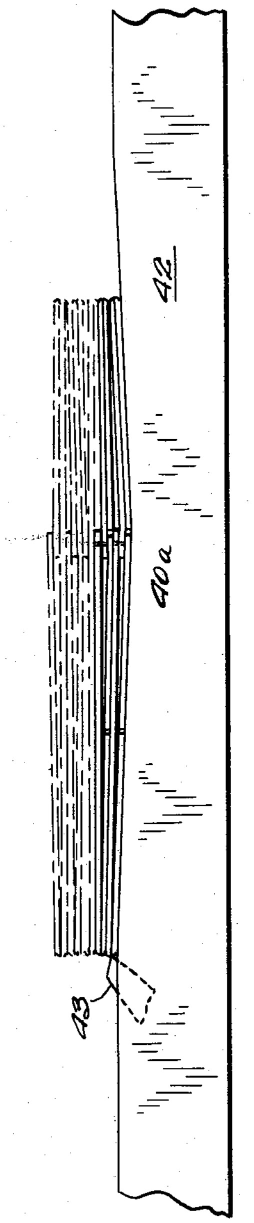
Fig. 5 is an enlarged partial cross-sectional view taken along the line 5—5 of Fig. 3.

When the sliding plate 46 is in its rearward position the dogs 43 are located rearwardly of the magazine 41. When the sliding plate moves in a forward direction the forward serrated edges of the dogs 43 engage the rearward folded edge of the lowermost case in the magazine as is illustrated in Fig. 5. Continued forward motion of the sliding plate carries the dogs forward and drives the lowermost case forwardly and out of the magazine 41 to the position shown in Fig. 27. Upon return or rearward movement of the sliding plate the upper surfaces of the dogs strike the forward folded edge of the lowermost case in the magazine and are forced downwardly thereby against the action of the springs 49. When the dogs have been moved to the rear of the magazine the springs 49 cause the dogs to pivot upwardly until the end of the screws 53 strike the blocks 52. The dogs are then in a position to engage the lowermost case in the magazine upon the next forward movement of the sliding plate.

As mentioned above the rails 42 which support the cases in the hopper are depressed near the center of the magazine. This arrangement is provided in order to permit the folded edges of the lowermost case, and in particular the rearward folded edge thereof, to rest firmly upon the upper surfaces of the rails. As is best seen in Fig. 5 the folded cases have a stapled joint 40*a* extending parallel to the folded edges of the cases. If the stack were supported on a flat surface the extra thickness of paperboard at this point would prevent the upper cases 40 from exerting pressure on the forward and rearward edges of the lowermost case with the result that at least one of the folded edges of the lowermost case might assume a position slightly above such flat surface upon which the folded cases were stacked. It will be apparent that if the rearward folded edge of the lowermost case were permitted to rise a short distance above the rails 42 the dogs 43 would fail to engage that edge and accordingly would not withdraw the case from the stack.

The depression in the rails 42 provides space for receiving the extra thickness of paperboard near the center of the case and thereby permits the forward and rearward edges of the lowermost case to rest firmly upon the upper surfaces of the rails. Expressed differently, the depressions in the rails enable the cases in the upper portion of the stack to bear on the forward and rearward portions of the lowermost case and thereby to force the folded edges of the lowermost case into contact with the upper surfaces of the rails. This feature of applicant's invention assures consistent and accurate functioning of the case-feeding apparatus.

The sliding plate 46 is actuated by an arm 55, see Figs. 25 and 27, which is pivotally connected at one end by a pin 56 to a bracket 57, the bracket in turn being rigidly secured to the sliding plate.

The arm 55 is pivotally connected at its other end to one link each of a pair of sprocket chains 58 through a pin 59. Each of the chains 58 rides on a pair of sprockets 60 and 61, best seen in Fig. 27. As the sprockets 60 and 61 rotate, the pin 59 and hence one end of the arm 55 are carried back and forth over a distance equal to that between the outer points of the sprockets 60 and 61. This motion is of course transmitted to the sliding plate 46 through the brackets 57.

Pairs of guides 62 are provided for the chains 58 to retain the chains, and in particular the links associated with the pins 59, in a predetermined path. The rearward sprockets 60 are preferably made adjustable in position in order that the tension of the chains 58 may be controlled. An adjusting mechanism 63 is provided for this purpose. Since the adjusting mechanism may be of any desired form well-known in the art and since it does not constitute a feature of applicant's invention, it will not be described in detail herein.

A pair of arms 64 are provided, extending forwardly of the forward wall of the magazine 41, for holding the folded cases down on the rails 42 as they emerge from the magazine. It will be noted in Figs. 1 and 4 that the rearward ends of the arms 64 are secured to the magazine structure while the forward ends depend on a pair of vertically extending arms 65. The latter arms are, in turn, secured to a pair of bars 66 which form a part of the rigid framework of the machine. The arms 64 serve merely to hold the emerging cases 40 against the rails 42 until the cases may be acted upon by a pair of flap spreaders 67 shown in detail in Figs. 6 and 7. The primary purpose of the flap spreaders 67 is to spread the flaps at the lateral edges of each case 40 to provide a V-shaped opening for convenient and reliable insertion into the case of a case holding member to be described subsequently.

Figure 3:
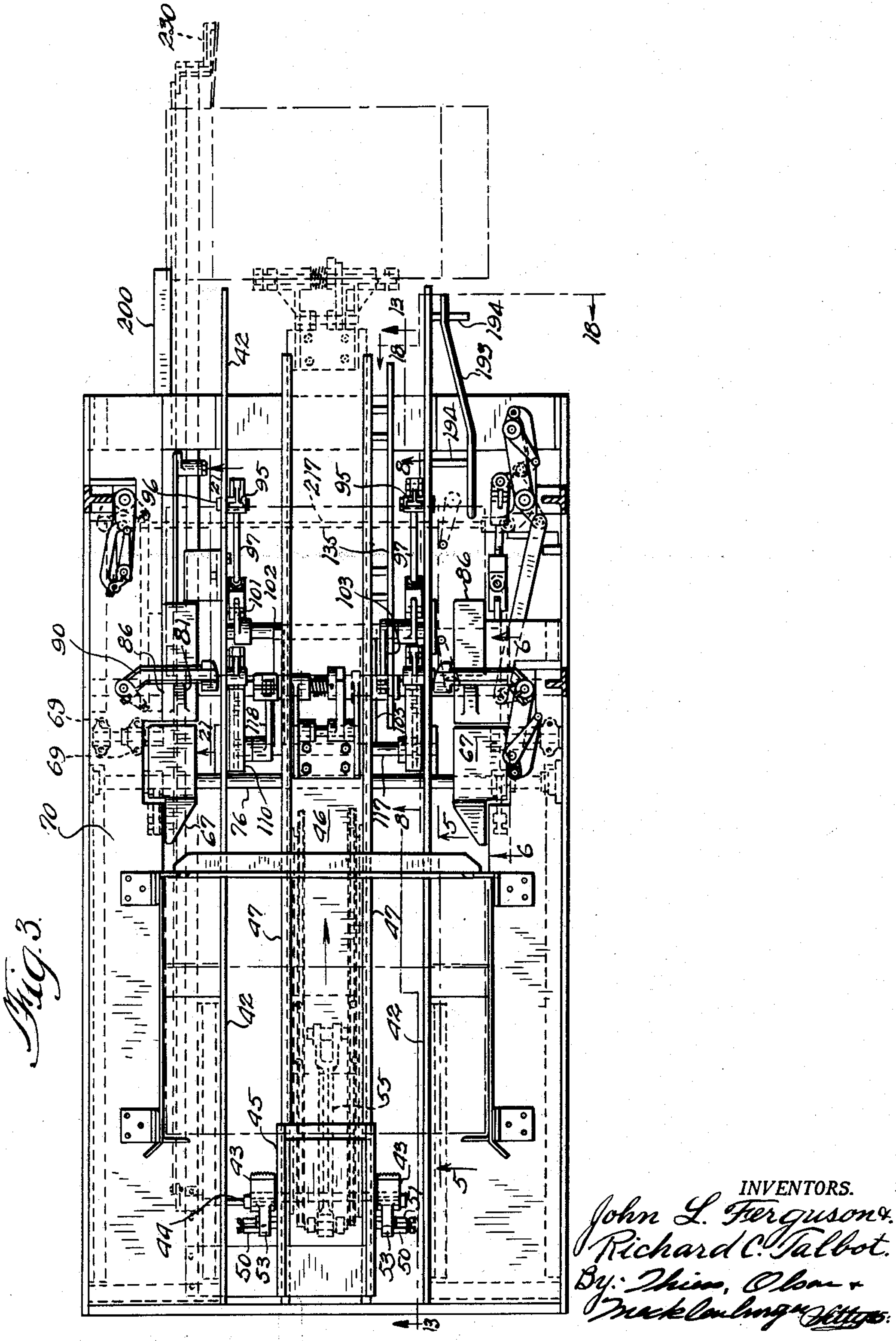
Fig. 3 is a plan view of the same machine on a somewhat smaller scale.

The flap spreaders are mounted on the ends of stub shafts 68 each of which is rotatably supported by a pair of bearings 69 secured to a shelf-like frame member 70 of the machine, as best seen in Fig. 3. The flap spreaders are therefore free to move up and down in a pivotal movement.

Figure 24:
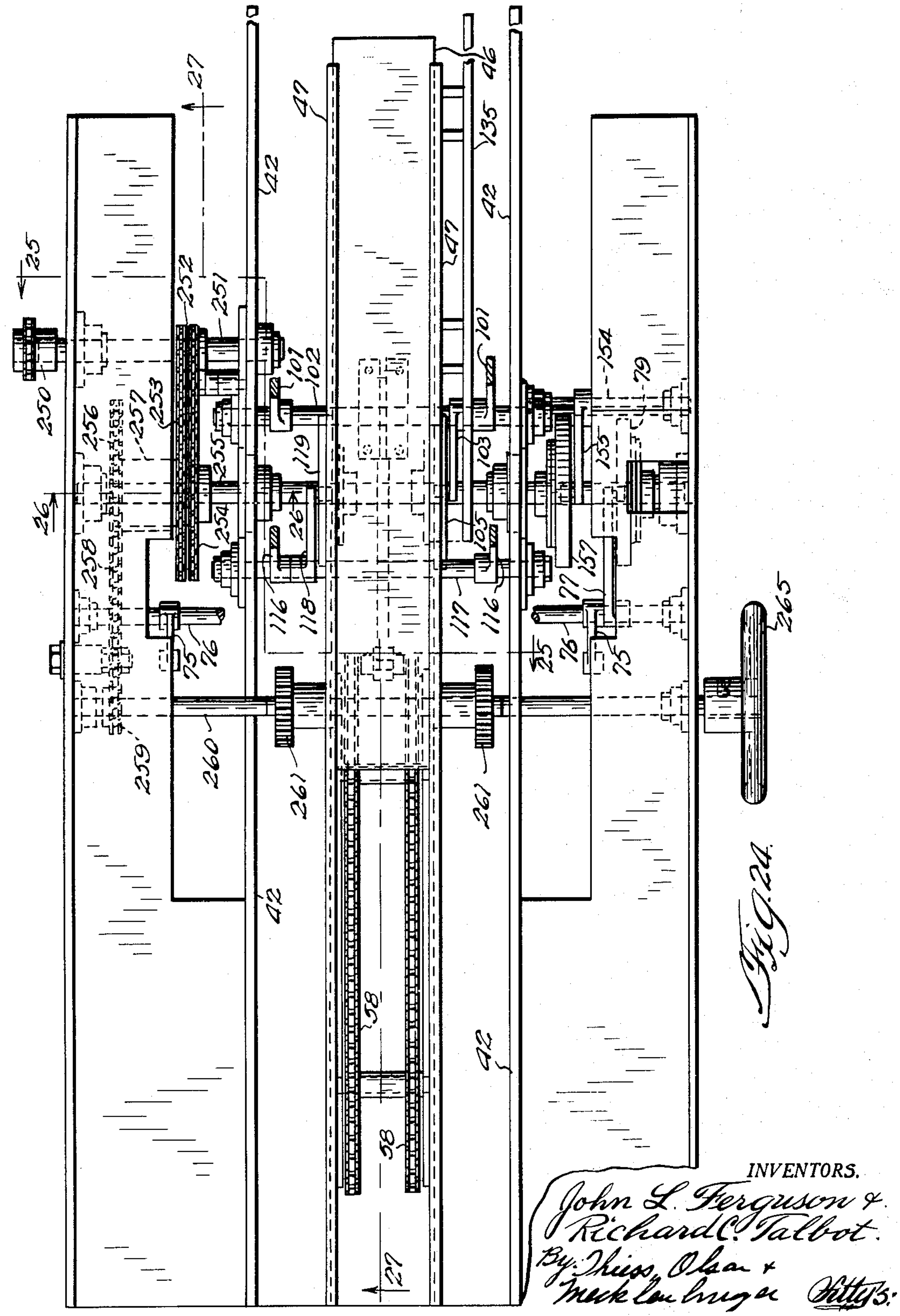
Fig. 24 is a partial plan view of the case handling machine with portions of the apparatus broken away to reveal the driving mechanism.

Each of the flap spreaders 67 is actuated by an adjustable link 71 pivotally connected through a pin 72 to an ear 73 integral with an extending downwardly from the flap spreader. The lower end of the link 71 is pivotally connected through a pin 74 to an arm 75. The two arms 75 for the two corresponding flap spreaders are secured to a common shaft 76 which is rotatably mounted in the frame of the machine as is best seen in Fig. 24. The shaft 76 is driven by an arm 77 secured thereto, a roller 78 being rotatably connected to the free end of the arm 77 and arranged to ride on a cam 79.

Figures 6, 7:
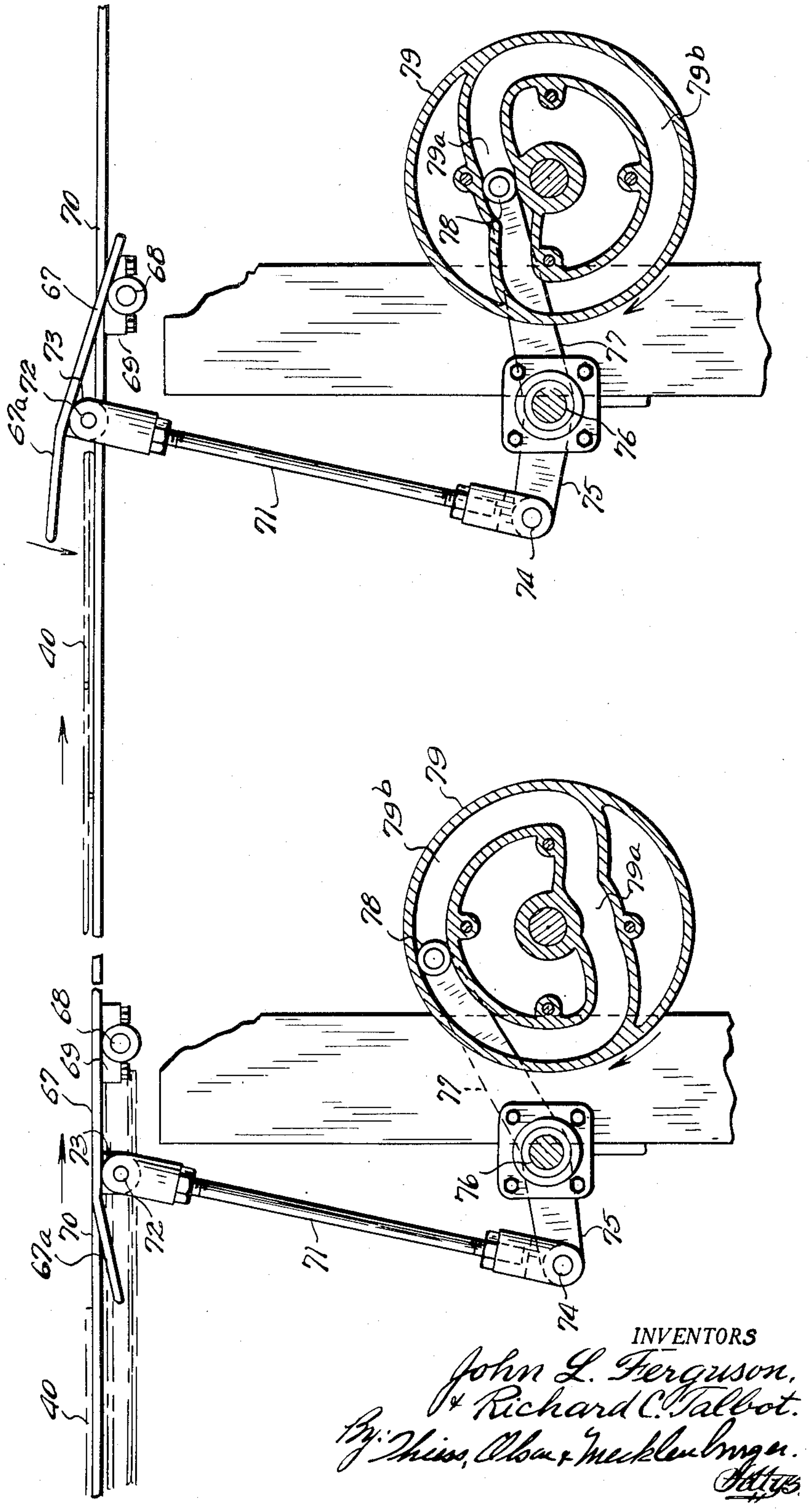
Fig. 6 is an enlarged partial cross-sectional view taken along the line 6—6 of Fig. 3.
Fig. 7 is a view similar to Fig. 6 but shows the apparatus in a different operating position.

It will be apparent upon inspection of Figs. 6 and 7 that when the roller 78 is engaged with the radially inward portion 79*a* of the cam track, as illustrated in Fig. 6, the arm 77 will be pivoted downwardly and the arms 75 and hence the flap spreaders 67 will be pivoted upwardly. Similarly when the roller 78 is engaged with the radially outward portion 79*b* of the cam, as illustrated in Fig. 7, the arm 77 will be pivoted upwardly while the arms 75 and hence the flap spreaders will be pivoted downwardly. It will be noted that the link 71 is in the form of a turnbuckle in order that the spacing between the pins 72 and 74 may be adjusted. Accordingly the two extreme positions of the flap spreaders may be adjusted with respect to the level of the cases 40 as determined by the rails 42.

Figures 28, 29, 30:
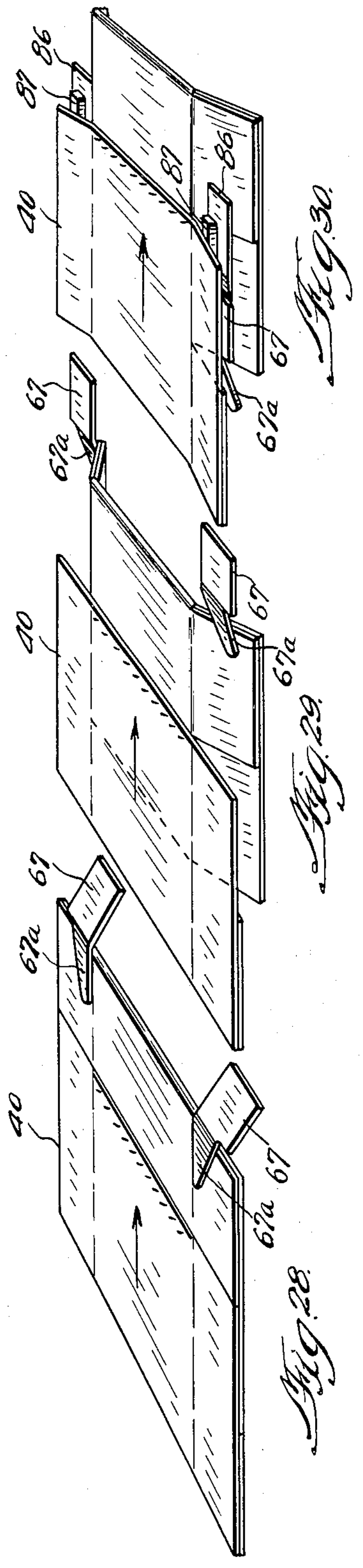
Figure 32:
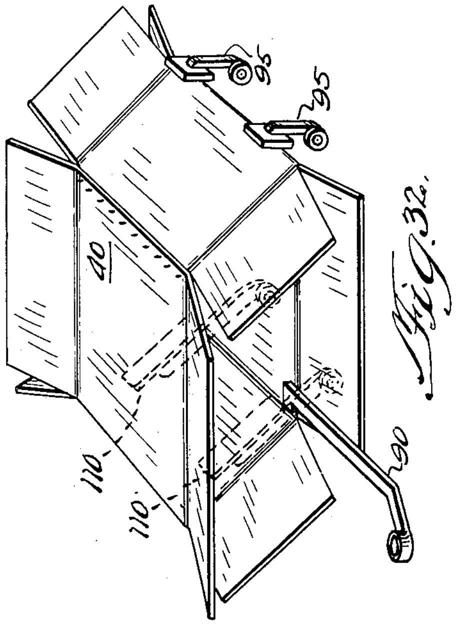
Figure 31:
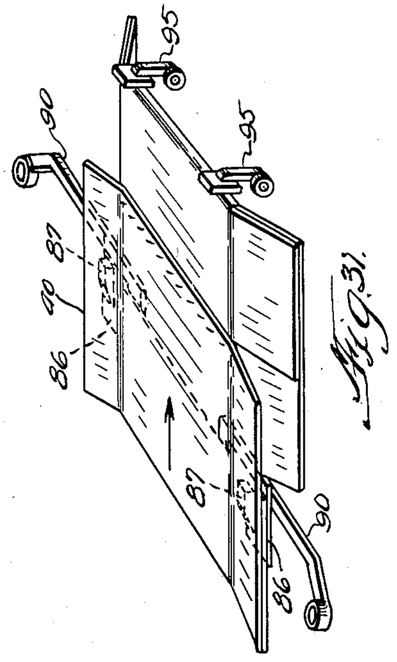

In Figs. 28 to 32 it will be seen that the cases 40 are advanced with the narrow flaps in the forward upper positions and the lower rearward positions. Correspondingly, the wider flaps are in the lower forward positions and in the upper rearward positions. As the forward folded edge of each successive case is advanced beyond the rearward edge of the flap spreaders 67, the flap spreaders are lowered from the position shown in Fig. 6 to the position shown in Fig. 7. As the flap spreaders are lowered they engage the narrow flaps in the forward upper positions and drive them downwardly. At the same time those flaps in turn drive the wide flaps in the forward lower positions downwardly, as illustrated in Figs. 28 and 29. As the case continues its forward motion the two rearward flaps at each side of the carton strike the beveled forward portions 67*a* of the flap spreaders 67 and are guided upwardly thereby.

Figures 21, 22, 23:
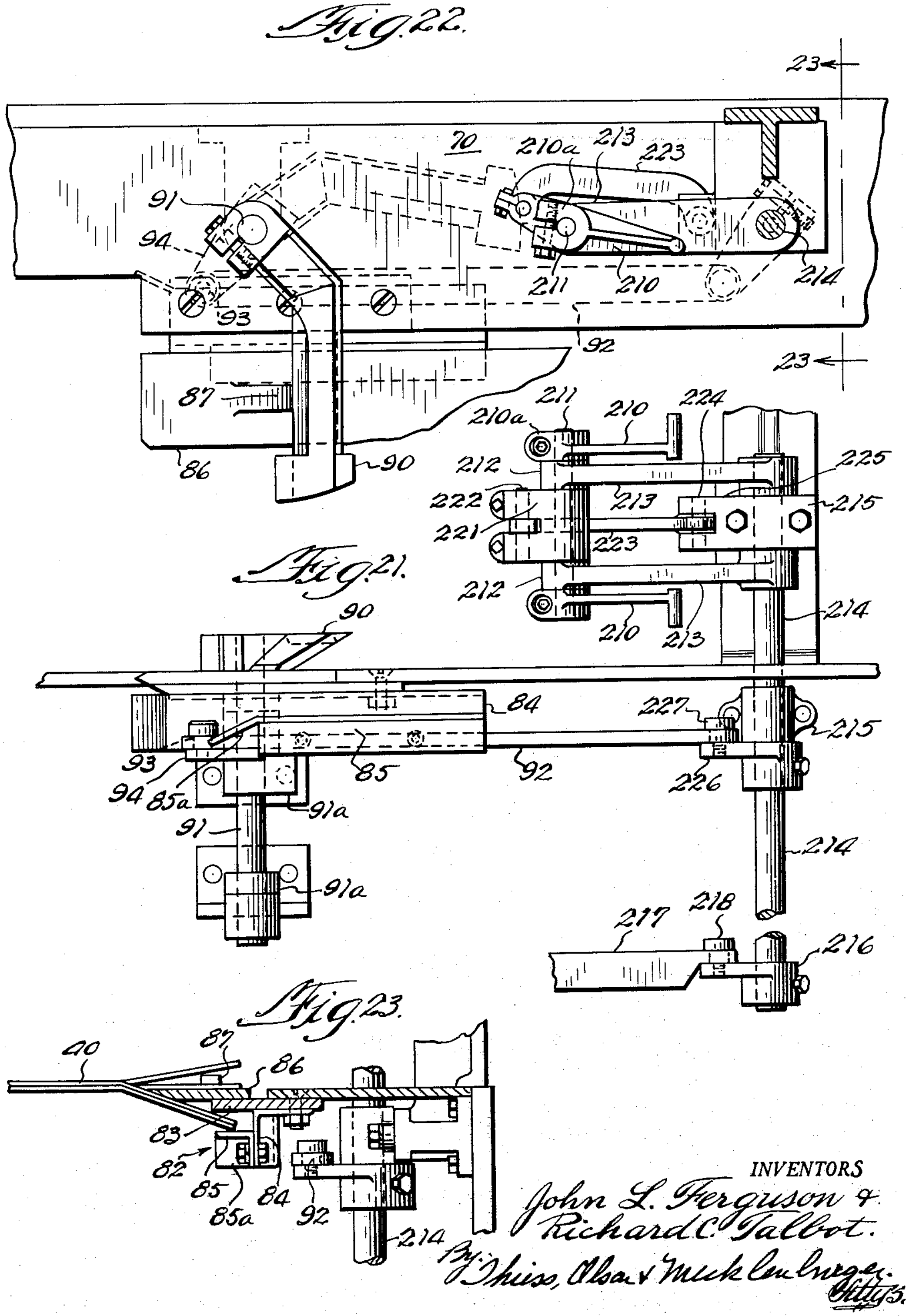
Fig. 21 is an enlarged partial cross-sectional view taken along the line 21—21 of Fig. 3.
Fig. 22 is a plan view of the same apparatus shown in Fig. 21.
Fig. 23 is a cross-sectional view taken along the line 23—23 of Fig. 22.

The forward flap at the left-hand side of each case, having been forced downwardly by the flap spreader, is caught beneath a guide rail 82, as best see in Fig. 23. This rail is composed of a flat plate 83, an angle iron 84 and, for a portion of its length, a second angle iron 85. The short length of angle iron 85 is bent downwardly at its forward portion 85*a* as seen in Fig. 21. The downwardly bent portion 85*a* catches the forward flaps of the cases and raises them upwardly to a position immediately below the plate 83 as illustrated in Fig. 23. Similarly the forward flaps at the right hand side of the case are caught beneath a plate 86 immediately to the rear of the flap sperader, one such plate being provided at each side of the machine.

The rearward flaps at both sides of each case are guided upwardly by the beveled edge 67*a* of the flap spreaders as explained above, and as the case continues its forward movement the rearward flaps slide over the upper surface of the plates 86 as seen in Figs. 3, 22 and 23. Further forward movement drives the upper rearward flaps up over wedge shaped projections 87 located on the plates 86. As illustrated in Figs. 23 and 30 the flaps at both ends of each case are thereby spread apart to form V-shaped openings for receiving a pair of caseholding members 90.

The case-holding members 90, best seen in Figs. 3, 21 and 22, are arranged one at each side of the case and serve to hold the rearward edge of the forward lower wall portion of the case downwardly when the lower rearward wall is bent upwardly by means subsequently to be described. The case holders are pivotally mounted on the frame of the machine and are arranged to pivot inwardly of the folded cases to case holding position and outwardly of the opened cases to permit their further movement toward loading position.

The case holder at the left-hand side of the machine, seen in Figs. 21 and 22, is secured to a shaft 91 which rotates in a pair of bearings 91*a* secured to the frame of the machine. The shaft 91 and hence the left-hand case holder is operated by a link 92 which is pivotally connected by a pin 93 to an arm 94, the latter being rigidly secured to the lower end of the pin 91. Means for driving the link 92 and means for operating the case holder at the right-hand side of the machine will be described subsequently.

A pair of case straighteners 95 are provided against which each case 40 is successively driven by the case feeding apparatus previously described. The case straighteners 95 engage the forward folded edge of each successive case and assure its proper alignment on the rails 42. After each successive case has been opened the case straighteners are removed from the path of the case to permit its continued forward travel. The case straighteners may be seen in Figs. 1, 2 and 3 and their operation will best be understood by reference to Figs. 4 and 8.

Each of the straighteners is pivoted about a fixed pin 96, secured to the corresponding rail 42, and is operated by a link 97 pivotally secured by a pin 98 to a downwardly extending portion 99 of the straightener. The other end of the link 97 is pivotally connected by a pin 100 to one end of an arm 101. The two arms 101, one for each straightener, are in turn mounted on a shaft 102 rotatably mounted in the frame of the machine as may be seen in Fig. 3. A single arm 103 is arranged to rock the shaft 102, this arm having at its free end a roller 104 (see Fig. 11) which rides on a cam 105.

Figures 8, 9, 10, 11, 12:
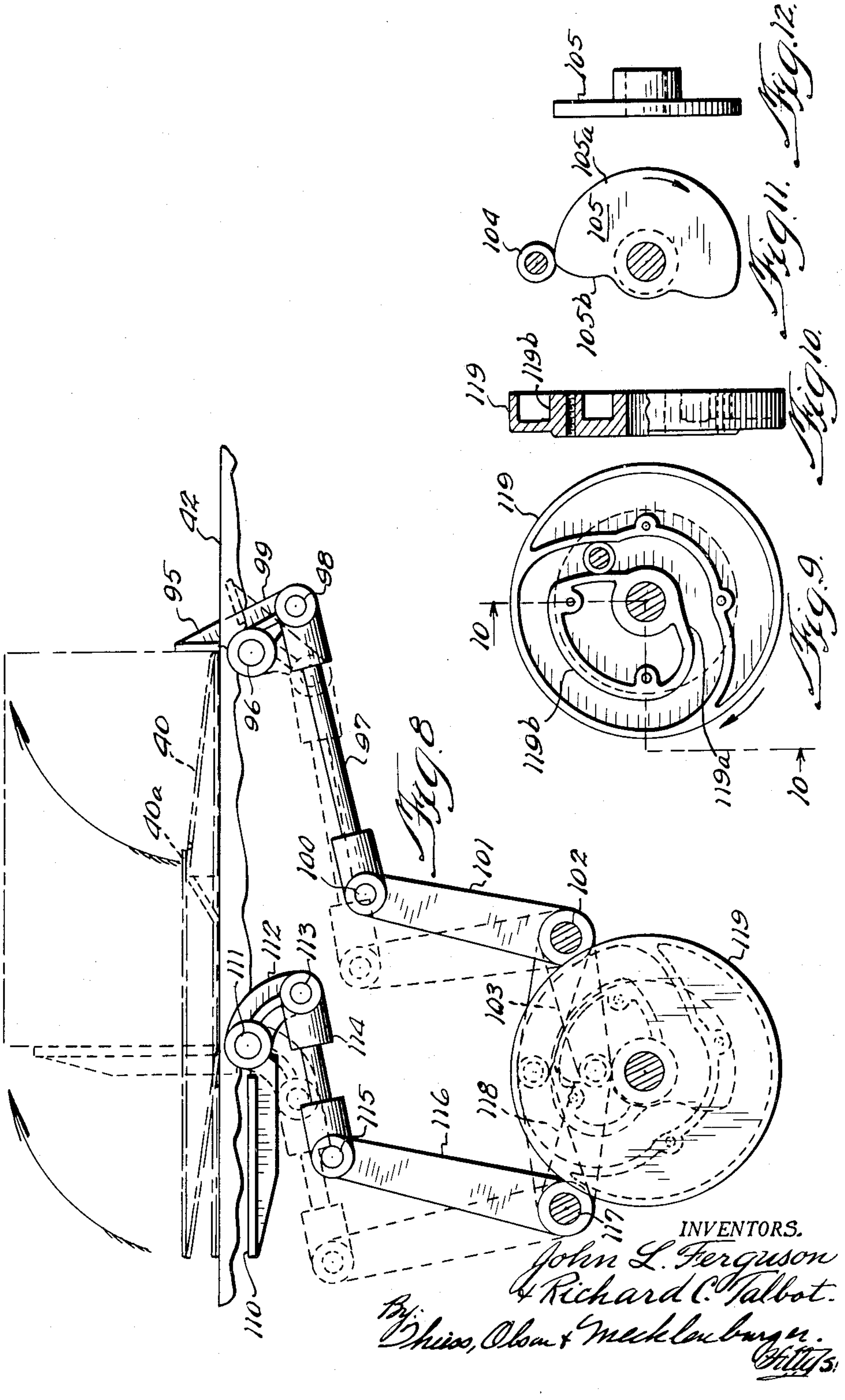
Fig. 8 is an enlarged partial cross-sectional view taken along the line 8—8 of Fig. 3.
Fig. 9 is a detail view of a portion of the apparatus shown in Fig. 8 looking in the opposite direction.
Fig. 10 is a cross-sectional view taken along the line 10—10 of Fig. 9.
Fig. 11 is a detail view of another portion of the apparatus shown in Fig. 8.
Fig. 12 is an end elevational view of the apparatus shown in Fig. 11.

When the roller 104 engages the lobe portion 105*a* of the cam the arm 103, the shaft 102, and the arms 101 are forced to their clockwise position as indicated by the solid lines in Fig. 8. The case straighteners are then in their upward or active position. When the roller 104 engages the radially inward portion 105*b* of the cam the case straightener apparatus assumes the position indicated by the dotted lines in Fig. 8, the straighteners being lowered so that the opened case may pass thereover.

Figure 2:
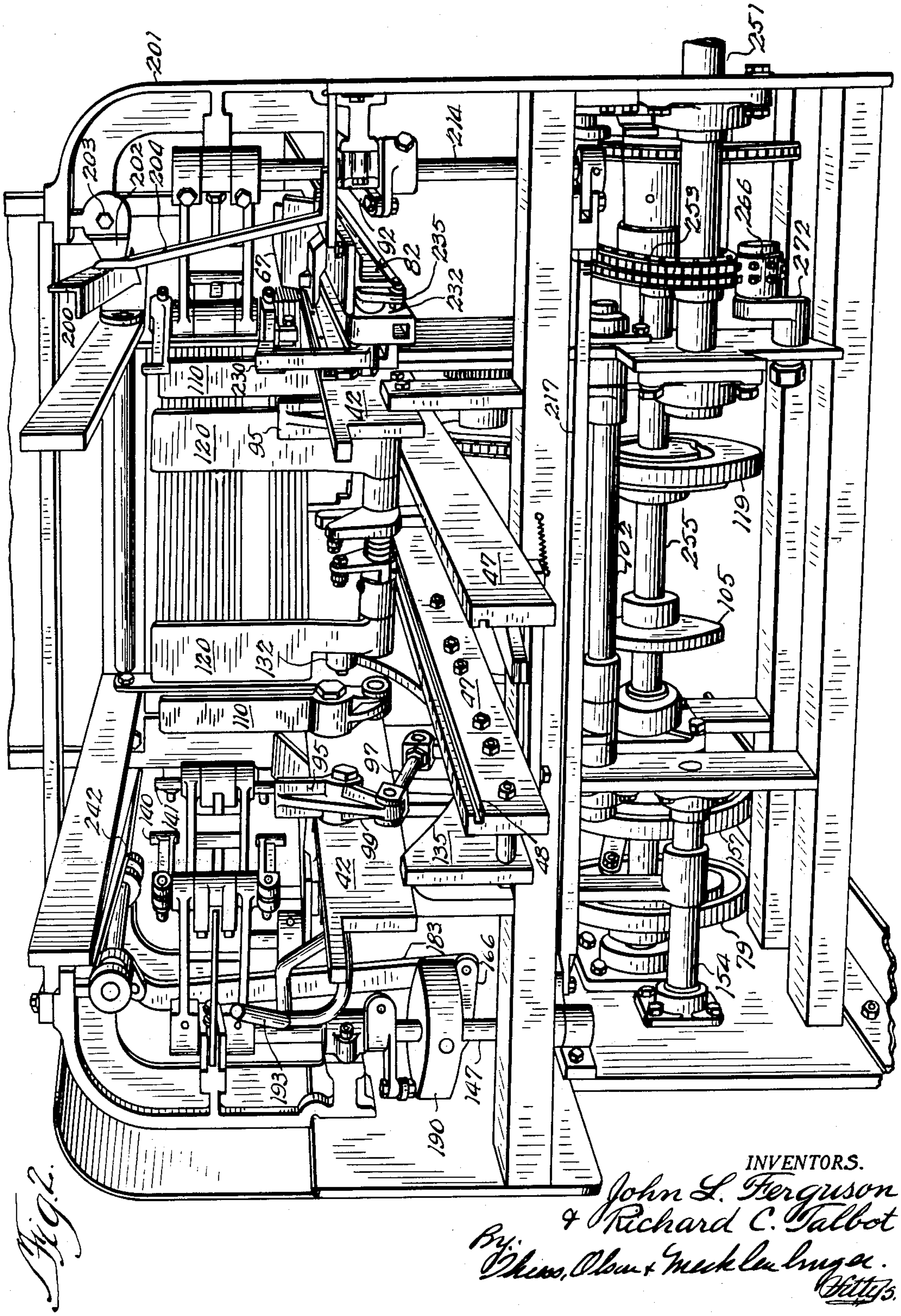
Fig. 2 is a perspective view of the same machine shown in Fig. 1 but taken from a different point of perspective.

With the case straighteners 95 engaging the forward folded edge of a case 40 and with the rearward edges of the case holders 90 lying along the scored line between the lower forward case wall and the lower rearward case wall, a pair of case openers 110, best seen in Figs. 2 and 8, engages the lower rearward wall of the case and swings it upward to a vertical position. The case openers are pivotally mounted on individual pins 111 which are set in the rails 42. A pair of arms 112 are secured to or integral with the respective case openers, each arm 112 being pivotally connected by a pin 113, as seen in Fig. 8, to a link 114 which is in turn pivotally connected by a pin 115 to one end of an arm 116. The other end of each arm 116 is secured to a shaft 117 which is rotatably mounted in the frame of the machine.

A single arm 118 is provided to rock the shaft 117, this arm having at its free end a roller 118*a* which rides on a cam 119. When the roller 118*a* engages the radially inward portion 119*a* of the cam, the arm 118, the shaft 117 and the arms 116 assume their clockwise position as indicated by the solid lines in Fig. 8. The case opener 110 is then in its lower position. When the roller 118*a* engages the lobe 119*b* of the cam, the case opener apparatus assumes the position indicated by the dotted lines in Fig. 8 wherein the case openers 110 have completed a case opening operation and extend vertically.

It will be apparent upon examination of Fig. 8 that as the case openers 110 pivot about the pins 111 in a clockwise direction they will engage the lower surface of the lower rearward wall portion of the case and force that wall portion forwardly and upwardly. It will also be apparent that with the case holders 90 holding the rearward edge of the lower forward wall portion down against the rails 42 and with the case straighteners 95 preventing forward motion of the case 40, the case will be opened to a position in which adjoining walls are at right angles to each other.

With the case opened and with the eight flaps extending laterally therefrom it is desired that the flaps at one end of the case be folded to closed position and that the flaps at the other end of the case be folded outwardly in order that the articles to be inserted in the case may enter freely. In the particular embodiment of the invention disclosed the cases are moved forwardly prior to the completion of this operation, forward movement of the opened case being provided by a pair of paddles 120. These paddles may be seen clearly in Fig. 2 while their operation may best be understood by reference to Figs. 13, 14 and 16.

The two paddles 120 are secured to a shaft 121 which is rotatably mounted in a pair of brackets 122 which are in turn rigidly secured to the sliding plate 46 previously described.

Figures 15, 16:
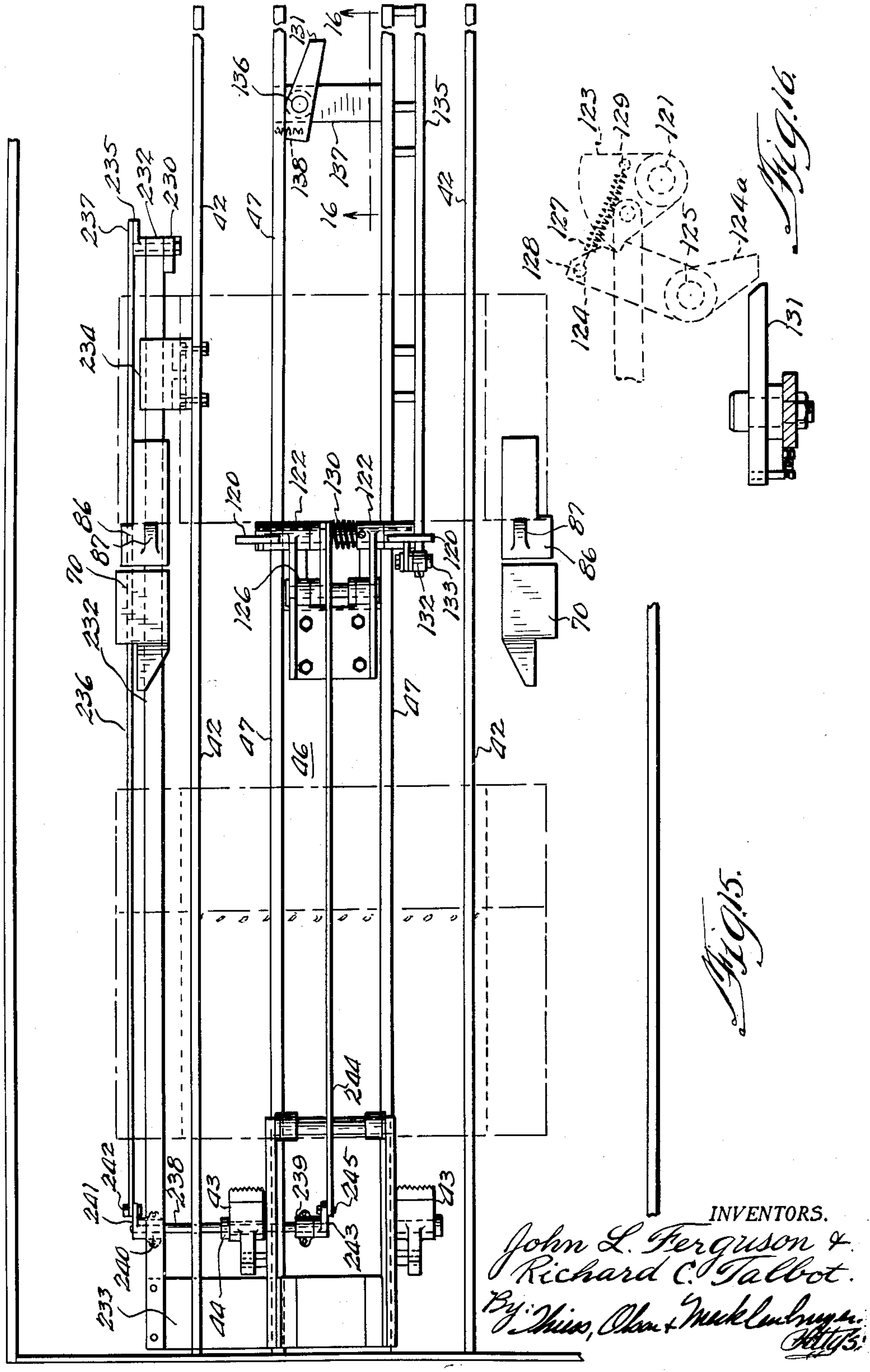
Fig. 15 is a plan view of the apparatus shown in Fig. 13.
Fig. 16 is an enlarged partial cross-sectional view of the apparatus shown in Fig. 15 taken along the line 16—16 of that figure.

Also secured to the shaft 121 is a cam 123, best seen in Fig. 16. The cam 123 normally maintains the paddles 120 in a vertical position by virtue of its engagement with a dog 124. The dog is secured to a pin 125 which is rotatably mounted in a pair of bearings 126, these bearings in turn being secured to or integral with the brackets 122. The dog 124 is urged forwardly by a tension spring 127 the ends of which are secured to a pin 128, extending from the dog 124, and a pin 129 secured in the cam 123.

A spiral spring 130 which is positioned around an exposed portion of the shaft 121 has one end secured to one of the brackets 122 and its other end secured to the cam 123. The loading of the spring 130 is such as to urge the came 123 in a counterclockwise direction as viewed in Fig. 16. Consequently the spring 130 urges the paddles 120 in a counterclockwise direction as viewed in Fig. 13.

With the spring 130 urging the cam 123 and hence the paddles 120 in the counterclockwise direction and with the dog 124 maintained in its cam engaging position by the spring 127, as illustrated in Fig. 16, the paddles 120 are maintained firmly in their vertical position illustrated in Fig. 13. The paddles 120 are thus positioned as the sliding plate 46 advances, whereby the paddles drive the opened cases forwardly to their loading position illustrated in Fig. 1.

As the sliding plate 46 moves rearwardly a downwardly projecting portion 124*a* of the dog 124 engages a trip lever 131 which causes the dog 124 to pivot about the pin 125 in a counterclockwise direction as viewed in Fig. 16. This releases the engagement between the dog and the cam 123 whereby the spring 130 drives the cam and hence the paddles 120 in a counterclockwise direction as viewed in Fig. 13.

A roller 132 is mounted through a pin 133 on a rearwardly extending ear 134 which is integral with one of the paddles 120. The roller 132 is in vertical alignment with a curved rail 135, extending along the path of the paddles, and is adapted to engage this rail when the paddles drop downwardly and rearwardly, as when the trip lever 131 disengages the dog 124 and the cam 123. As will be noted in Fig. 13 the configuration of the rail 135 is such as to permit the paddles 120 to assume a horizontal position during the major portion of the return stroke of the sliding plate 46.

As the sliding plate 46 and hence the paddles 120 aproach the rearward portion of their strokes the roller 132 is raised upwardly by the rearward sloping portion of the rail 134 and when the roller 132 reaches the highest point of the rail the cam 123 (see Fig. 16) is rotated in a clockwise direction against the urging of the spring 130 to a sufficient extent that the spring 127 can bring the dog 124 into latching engagement with the cam. Accordingly the paddles 120 are again locked in their vertical position.

Referring specifically to Fig. 13 the paddles 120 are illustrated in their vertical position in readiness to drive an opened case in the forward direction. This position of the paddles is shown in solid lines and is designated by the letter A in Fig. 13. The sliding plate 46 then drives the paddles 120 and hence the open case 40 in a forward direction, an intermediate position of the paddles being shown in phantom lines in Fig. 13 and designated B. The position of the paddles at the end of their forward stroke is also shown in phantom lines and is designated C.

On the return stroke of the paddles the trip lever 131 trips the dog 124, as previously explained, after which the position of the paddles is determined by the roller 132 riding on the rail 135. An intermediate position of the paddles during the return stroke is shown in phantom lines and is designated D. It will be noted that with the paddles 120 lowered to a horizontal position as in D of Fig. 13, as they are during the major portion of their return stroke, the paddles will pass under a case 40, which will have arrived at the position of the case illustrated in Fig. 13 sometime subsequent to the removal of the next preceding case by the paddles 120 and prior to the completion of the return stroke of the paddles.

As will be seen best in Fig. 15 the trip lever 131 is pivotally mounted on a pin 136 which is in turn secured to a frame member 137. A tension spring 138 is connected between one of the inner rails 47 and a rearward portion of the trip lever 131 as illustrated. The spring 138 urges the forward or tripping portion of the lever 131 inwardly toward the center of the machine and toward tripping position. The pivotal mounting of the trip lever is provided in order that the trip lever may be thrust aside by the lower portion 124*a* of the dog 124 to permit the forward passage thereof. The spring 137 returns the trip lever to tripping position after the dog 124 has passed with the result that the trip lever is in position to trip the dog upon the return stroke of the sliding plate 46 and the paddles 120.

Apparatus is provided for folding the closing flaps at the right-hand side of the cases inwardly of the case to their closed positions prior to and during the forward movement of the successive cases by the paddles 120. The flaps are maintained in such closed positions during the loading operation in order that cans, cartons or other articles which are thrust into the case may be held in their proper position within the case. The apparatus provided for operating on the flaps at the right-hand side of the machine includes a pair of forward inner flap folding arms 140, a pair of rearward inner flap folding arms 141 and a top flap lifter 142. These parts may be seen in Figs. 2, 3 and 4 and their operation may best be understood by reference to Figs. 17, 18, 19 and 20.

The forward inner flap folders 140 are adjustable secured to a shaft 143 by conventional clamping means 144. The shaft 143 is rotatably mounted in a pair of bearings 145 which form the ends of a pair of links 146 respectively. The other ends of the links 146 are secured to a vertically extending shaft 147 which is rotatably mounted in a series of bearings 148 secured to the frame of the machine.

Figure 17:
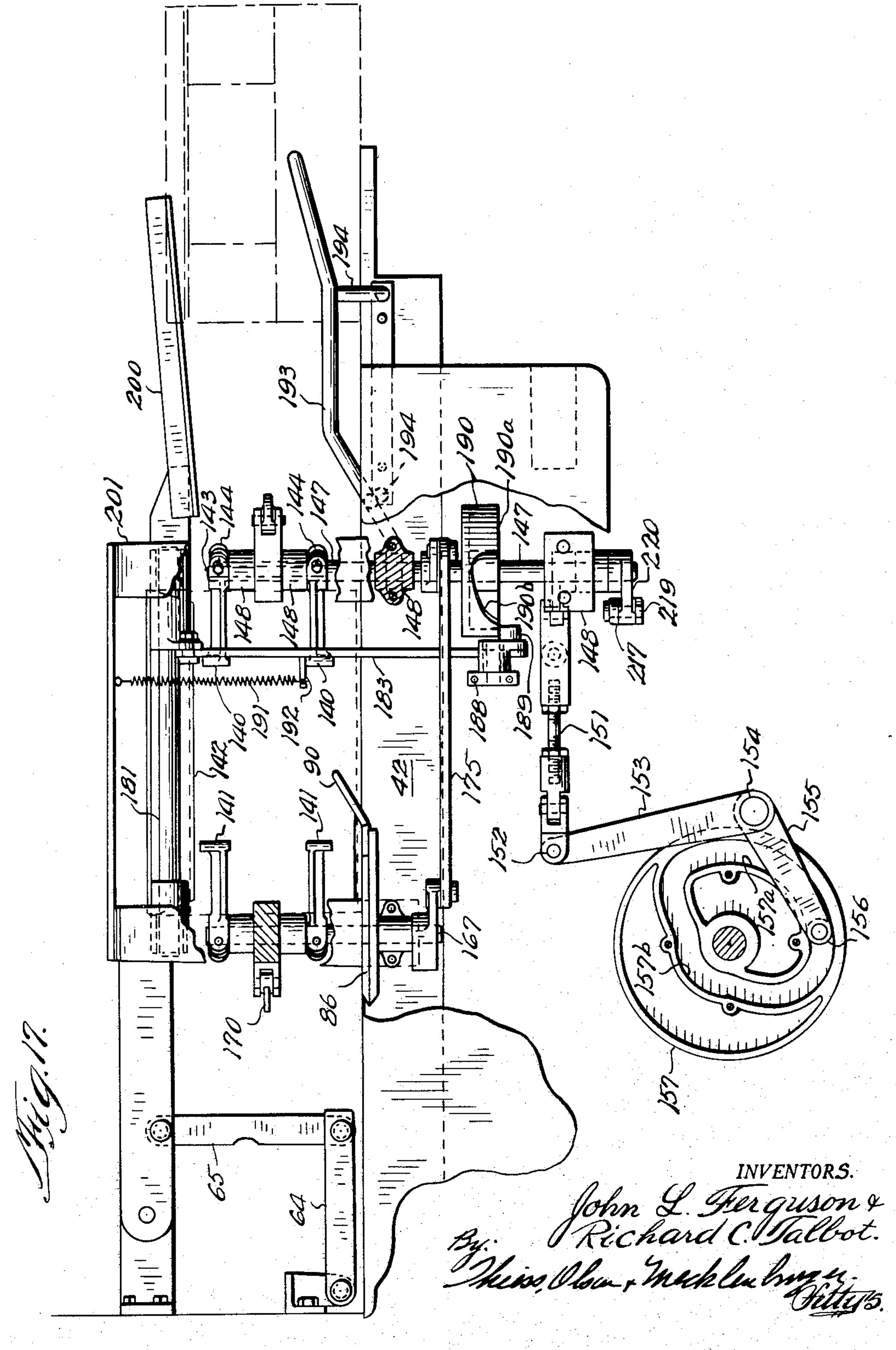
Fig. 17 is an enlarged partial side elevational view of the case handling machine with portions of the machine partially broken away.

Near the bottom of the shaft 147 there is connected thereto an arm 149 which is pivotally connected by the pin 150 to one end of an adjustable link member 151 best seen in Fig. 17. The other end of the link 151 is pivotally connected by a pin 152 to one end of an arm 153, the other end of the arm 153 being secured to the shaft 154 which is rotatably mounted in the frame of the machine as may best be seen in Fig. 24. Also connected to the shaft 154 is an arm 155 at whose free end there is a roller 156 which rides on a cam 157.

Tracing this line of drive mechanism, it will be apparent that when the roller 156 is engaged with the radially outward portion 157*a* of the cam the arms 155 and 153 will be in their counterclockwise position as indicated in Fig. 17. The adjustable link 151 will be in its rearward position or in its left-hand position as viewed in Fig. 17 and the shaft 154 will be in its counterclockwise position as viewed in Figs. 19 and 20. Accordingly the arms 146 will be in their counterclockwise position as illustrated in Fig. 20. Correspondingly when the roller 156 engages the radially inward portion 157b of the cam 157 the driving mechanism will be moved to its other extreme position and the arm 146 will be moved in a clockwise direction to the position shown in Fig. 19.

Since the arms 146 rotatably engage the shaft 143 upon which the arms 140 are mounted, movement of the arms 146 does not in itself control the angular orientation of the shaft 143. However, there is also secured to the shaft 143 a short arm 158 pivotally connected by a pin 159 to one end of a link 160. The other end of this link is pivotally connected by a pin 161 to a bracket 162 which is, in turn, rigidly connected to the frame of the machine. The arms 146 and 158, the link 160, and the bracket 162 form a quadralateral linkage system having opposite sides of unequal length. As a result, and as will readily be understood by inspection of Figs. 19 and 20, when the arm 146 rotates in a counterclockwise direction the short arm 158 is caused to pivot in a clockwise direction with respect to the base and other fixed portions of the machine. Such angular displacement of the arm 158 rotates the shaft 143 and hence the flap folding arms 140 in a clockwise direction. Accordingly, as the arms 146 rotate in a counterclockwise direction the free ends of the flap folding arms 140 move first inwardly of the machine from the position shown in Fig. 19, and then rearwardly and further inwardly to the position shown in Fig. 20. As is readily seen in those figures such movement folds the forward inner flap of the case to its closed position.

The rearward inner flap folding arms 141 are operated by a linkage system similar to that employed in connection with the forward inner flap folding arms 140. The flap folding arms 141 are secured to a shaft 163 by a clamping means 164, the shaft 163 being rotatably mounted in one end of each of a pair of arms 166 which are in turn secured at their other ends to a vertically extending shaft 167. A short arm 168 is secured to the shaft 163 and pivotally connected by a pin 169 to one end of a link 170. The other end of this link is pivotally connected by a pin 171 to a bracket 172 which is rigidly secured to the frame of the machine.

As the shaft 167 is rotated the free ends of the rearward inner flap folding arms 141 will be caused to follow a path similar to that of the arms 140 except that the motion will be first inwardly of the machine and then forwardly and further inwardly, whereby the arms drive the rearward inner flap of the case to its closed position. Movement of the shaft 167 is obtained through its connection to the shaft 147 of the forward inner flap folder. An arm 173 is secured to the shaft 167 and is pivotally connected by a pin 174 to one end of a link 175. The other end of this link is pivotally connected by a pin 176 to an arm 177 which is secured to the shaft 147 of the forward inner flap folder. It will now be apparent that as the shaft 147 rotates in a counterclockwise direction to drive the forward inner flap folding arms 140 in the flap folding direction the link 175 will be driven forwardly or to the right in Fig. 19 with the result that the shaft 167 will rotate in a clockwise direction and drive the rearward inner flap folding arms 141 in their flap folding direction.

The case holder 90 at the right-hand side of the machine, previously described, is secured directly to the shaft 167 and is operated thereby. By reference to Figs. 19 and 20 it will be seen that when the flap folding arms 141 are withdrawn the case holder is extended in case holding position. After the case has been opened by the case openers 110 the flap folding arms operate and the case holder 90 is withdrawn.

When the forward and rearward inner flaps are being folded inwardly to their closed positions by the forward and rearward inner flap folding arms 140 and 141 respectively, it is desirable that the upper and lower case flaps be bent a short distance outwardly of the case in order to prevent their interference with the closing of the inner flaps. Interference by the lower flap is prevented by the fact that it has been bent downwardly below the plate 86 on the right-hand side of the machine by the right-hand flap spreader 67 as previously described. In order to prevent interference by the upper flap with the closing of the forward and rearward flaps, the top flap lifter 142, previously mentioned, is arranged to lift the upper flap shortly before the closing operation of the flap folding arms 140 and 141.

Figure 18:
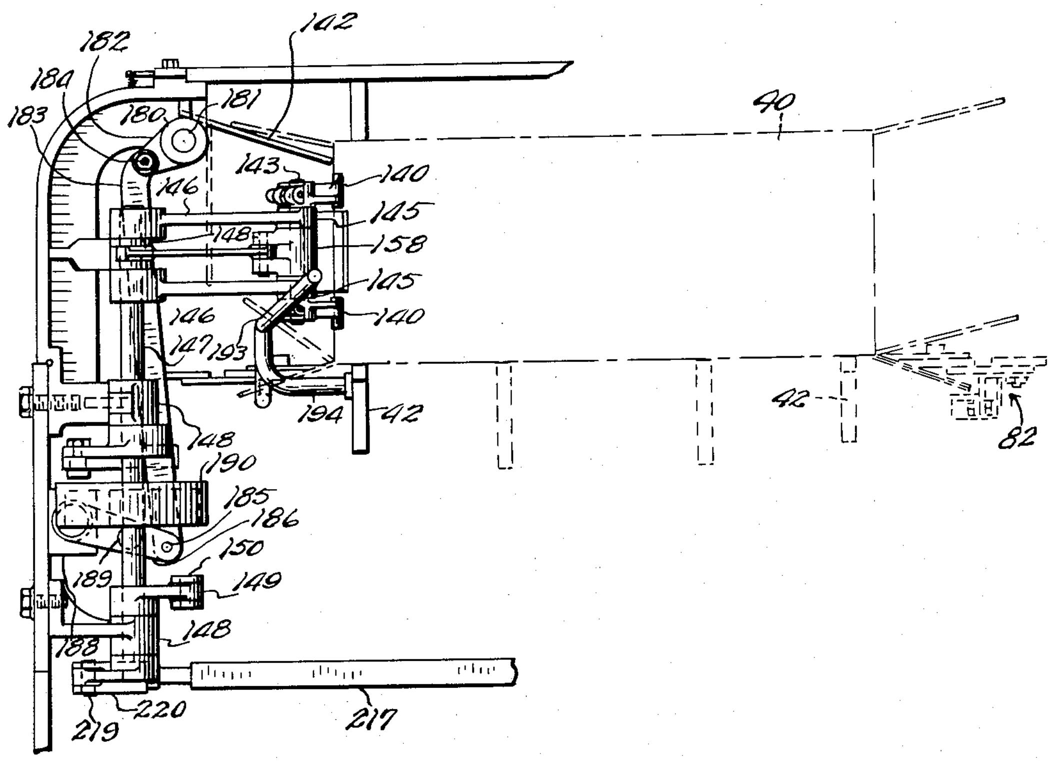
Fig. 18 is a front elevational view of the same apparatus shown in Fig. 17 taken along the line 18—18 of Fig. 3.

The top flat lifter 142 consists of a metal sheet secured to a pair of journals 180 which are rotatably mounted on a shaft 181. A lug 182 extends outwardly of the forwardmost journal 180 and is pivotally connected to a link 183 by a pin 184. This link extends downwardly, as best seen in Figs. 17 and 18, and the lower end is pivotally connected by a pin 185 to one end of an arm 186. The other end of this arm is pivotally connected through a pin 187 to a bracket 188 which is in turn rigidly connected to the frame of the machine.

Near the middle of the arm 186 is a roller 189 which rides on the lower surface of a cam 190, secured to the shaft 147 which drives the two inner flap folding arms 140 and 141. A tension spring 191 best seen in Fig. 17 is connected between the frame of the machine and a pin 192 connected to the link 183. The spring 191 urges the link 183 upwardly and accordingly urges the roller 189 into contact with the cam 190.

When the shaft 147 and hence the cam 190 oscillate under the influence of the cam 157 as previously described, the link 183 and the top flap lifter 142 are lowered and raised alternately as the roller 189 follows the contour of the cam 190. More specifically, when the roller 189 is in engagement with the lower surface 190a of the cam, the arm 186 and hence the link 183 are in their lower positions and the top flap lifter 142 will be in its raised position. Correspondingly when the roller 189 enters the recess 190b of the cam, the arm 186 and the link 183 will be raised and the top flap lifter 142 will be lowered to a vertical position indicated by the dotted lines in Fig. 18.

Figure 19:
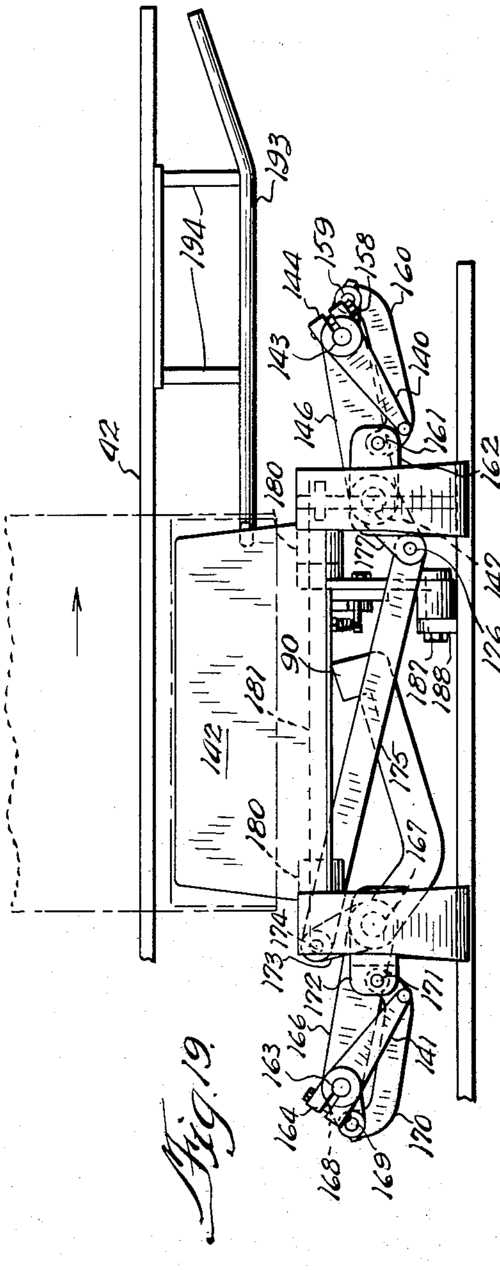
Fig. 19 is a plan view of the same apparatus shown in Figs. 17 and 18.
Figure 20:
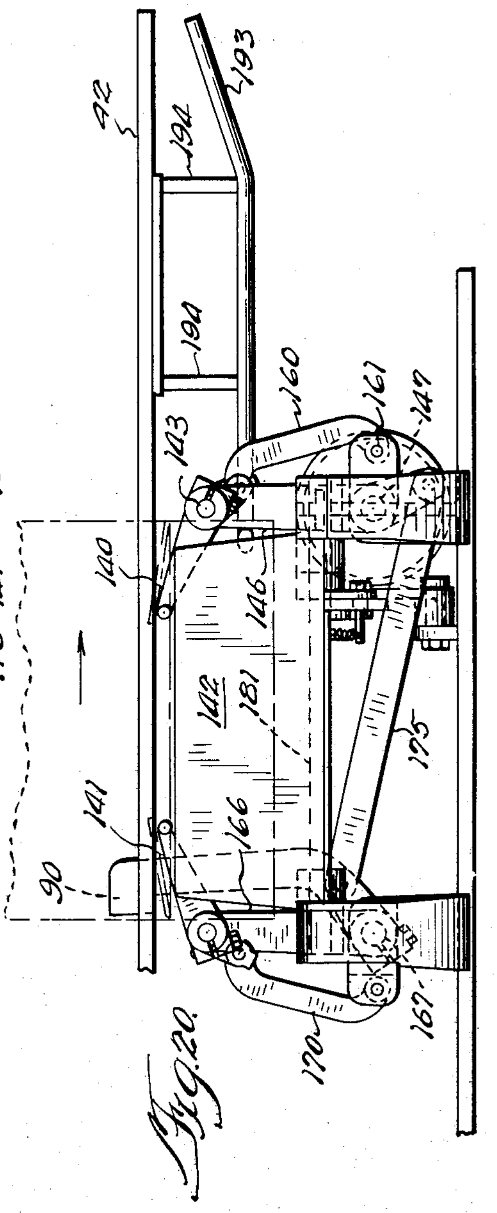
Fig. 20 is similar to Fig. 19 but showing the apparatus in a different operating position.

When an opened case is placed in position alongside the apparatus shown in Figs. 18, 19 and 20, the top flap lifter 142 is raised and lifts the upper flap substantially above the upper edges of the inner flaps of the case. It will be noted in Fig. 18 that the pivoted edge of the top flap lifter is located above the top wall of the case with the result that the top flap may be raised even though the free edge of the top flap lifter lies substantially below the upper edges of the inner flaps. When the inner flap folding arms 140 and 141 fold the inner flaps to their closed position the upper edges of the inner flaps strike the lower surface of the top flap lifter and force it upwardly against the action of the spring 191, the roller 189 becoming momentarily disengaged from the cam 190. As the inner flaps reach their closed positions the top flap lifter 142 drops back down to the normal raised position illustrated in Fig. 18 wherein the free edge thereof engages the outer surfaces of the two inner flaps and hold them in their closed positions.

As the case starts its forward motion under the influence of the paddles 120, and after moving only a short distance forward, the rearward edge of the lower flap at the right-hand side of the case reaches the end of the plate 86 located on the right-hand side of the machine and the forward edge encounters a guide member 193 in the form of a bent tube, best seen in Figs. 17, 18, 19 and 20. The guide member 193 is fixed in position relative to the frame of the machine, being rigidly secured thereto by brackets 194. The rearward portion of this guide member engages the lower flap and forces it upwardly toward its closed position and thereby holds the inner flaps in their closed positions, all prior to disengagement of the inner flaps from the top flap lifter 142.

It will be noted in Fig. 17 that the guide member 193 extends forwardly a sufficient distance that it holds the lower flap and hence the two inner flaps in their closed positions when the case is in the loading position which is indicated by the case shown in dotted lines in Fig. 17.

The upper flap on the right-hand side or closed end of the case may be caused to bend downwardly to its closed position by a guide member similar in character to the guide member 193. However, it is not essential that the upper flap be closed prior to the insertion of cans, cartons or other articles in the case under many circumstances, and, accordingly, closing apparatus for the upper flap is not disclosed in the drawings.

As each successive case 40 is moved forwardly by the paddles 120, the closing flaps at the left-hand side are bent outwardly in order that the articles to be contained in the case may more readily be inserted therein. The lower flap of the opened case is bent downwardly at a slight angle by virtue of its engagement with the rail 82 as previously explained. As will be seen in Fig. 1, the rail 82 extends sufficiently far forward that it can maintain the lowermost flap in downwardly bent position even after the case has reached the loading position.

Figure 1:
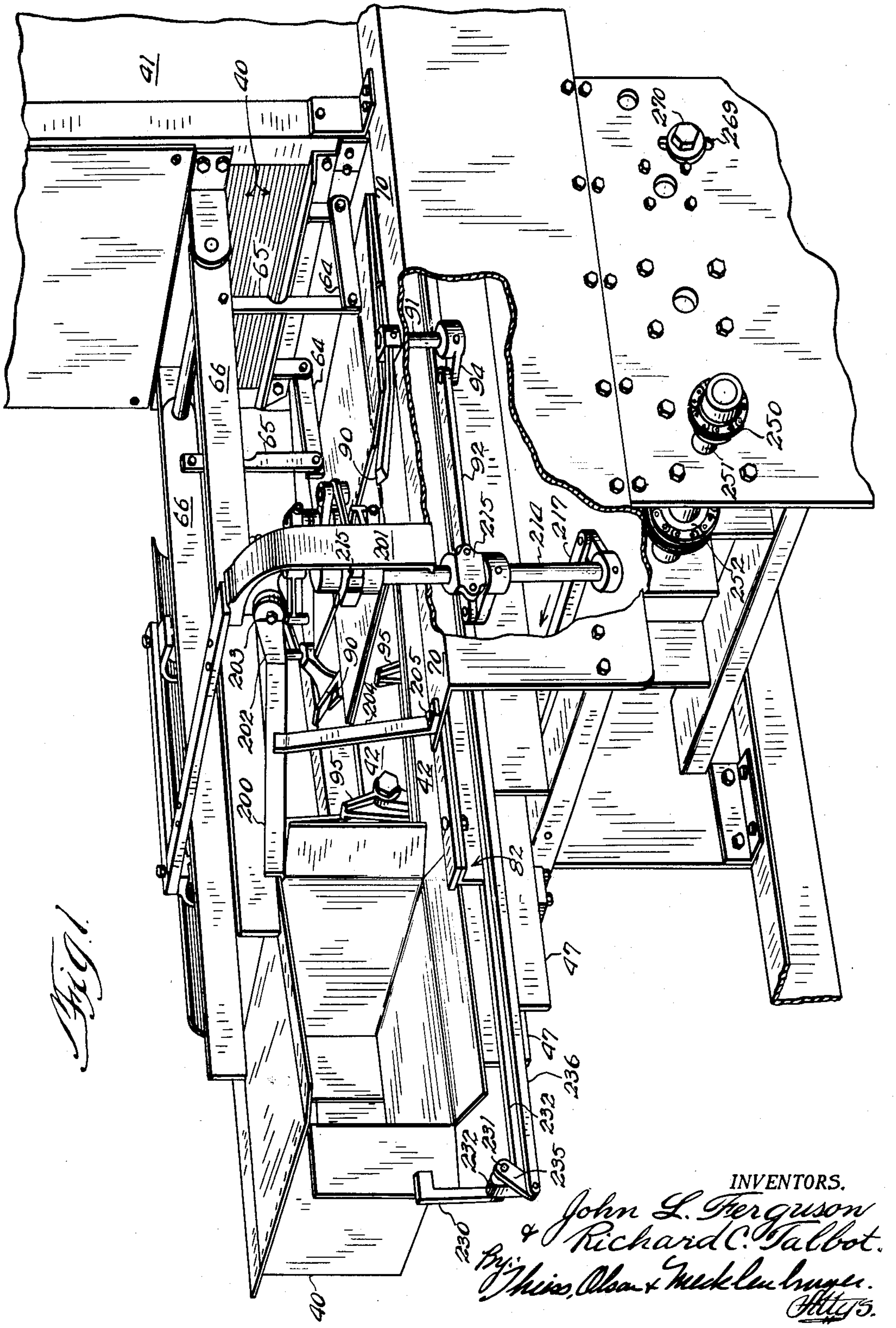
Fig. 1 is a perspective view of a case handling machine incorporating one embodiment of the invention.

The upper flap of the case is bent upwardly at a slight angle by an angle iron 200 provided for that purpose. This member is best seen in Figs. 1 and 17 in which it will be noted that it slopes forwardly and upwardly. The lower or rearward end of the angle iron lies appreciably below the normal position of the upper flap with the result that as a case 40 is advanced by the paddles 120 the forward outer corner of that flap engages the upper surface of the horizontal leg of the angle iron. As the case 40 continues its forward movement the upper flap is guided upwardly along this surface until, when the case reaches the position shown in Fig. 1, the flap is bent upwardly at an appreciable angle.

The angle iron 200 is adjustably mounted on a frame member 201 seen in Fig. 1 by means of an arm 202 secured to the angle iron and fastened to the frame member 201 by any suitable means such as a screw 203. The central portion of the angle iron is supported by an arm 204 which is fastened to the shelf-like frame member 70 as by a screw 205. The upper end of the arm 204 is preferably welded to the angle iron but is sufficiently yielding that some adjustment may be made in the slope of the angle iron by loosening the screw 203 and adjusting the angle of the arm 202 with respect to the frame member 201.

A machine for loading articles into the successive cases 40 preferably has a throat or chute, not shown in the drawings, which extends substantially to the folds of the closing flaps of the cases. In view of this it will be apparent that no problems arise in handling the rearward vertically extending closing flap at the opened or left-hand side of the case. This flap may be allowed to extend outwardly in its normal position and when the case reaches the loading position that flap will strike the side of the throat or chute of the loading machine and accordingly will never be in a position to interfere with the loading of articles into the case.

It will also be apparent that the leading vertically extending flap at the left-hand side of each case must be bent forwardly or outwardly of the case to an angle of substantially 90° to the adjoining wall portion of the case in order that it may pass in front of the throat of the loading machine and not be caught within the throat to interfere with the proper loading of the case. Flap spreaders, best seen in Figs. 1, 3, 21 and 22 are provided for this purpose.

The flap spreaders include a pair of arms 210 adjustably mounted on a common vertical shaft 211 by clamping members 210a best seen in Fig. 22. The shaft 211 is freely rotatable in a pair of bearings 212 which are formed at one end of a pair of arms 213 respectively. The other ends of the arms 213 are secured to a shaft 214 which is rotatably mounted in a pair of bearings 215 secured to the frame of the machine.

The shaft 214 is rocked in its bearings by an arm 216 secured thereto, the arm 216, in turn, being driven by a link 217 which is pivotally connected at one end to the arm 216 by a pin 218. The other end of the link 217 is connected through a pin 219 and an arm 220 to the vertical shaft 147 which drives the flap spreaders 140 and 141 at the right-hand side of the machine. This connection is readily seen in Figs. 17 and 18 while the entire link 217 may best be seen in Fig. 3.

Returning to the flap spreader at the left-hand side of the machine, it will be noted best in Fig. 22 that a linkage mechanism is provided for controlling the angular orientation of the flap spreader arms 210 which is very similar to the apparatus previously described for controlling the flap spreader arms 140 and 141 at the right-hand side of the machine. A short arm 221 is secured to the shaft 211 and supports a pin 222 through which one end of a link 223 is pivotally secured thereto. The other end of the link 223 is pivotally connected by a pin 224 to a bracket 225 which is integral with the upper bearing 215 guiding the vertical shaft 214. A quadrilateral linkage system is thus formed in which opposite legs are of unequal length. Accordingly, and as may readily be seen in Fig. 22, a counterclockwise movement of the arms 213, as viewed in that figure, will result in the flap spreader arms 210 being pivoted in a clockwise direction about the axis of the shaft 211. The flap spreading arms 210 are thus moved first inwardly of the machine and then forwardly and further inwardly to strike the inner surface of the forward vertical flap at the left-hand side of an opened case and drive that flap forwardly or outwardly of the case to any desired angle, depending upon the position of the case and the extent of the movement of the arms 210.

In the description of the case holding member 90, the movement of that member was shown to be effected by a link 92. In Figs. 21 and 22 that link is shown connected to the shaft 214 through an arm 226 secured to the shaft, the link 92 pivotally engaging the arm 226 through a pin 227. It will be apparent that as the shaft 214 oscillates to drive the flap spreading arms 210 it will also operate the case holding member 90 through the link 92. More specifically, when the flap folding arms 210 fold the forward vertical flap outwardly of the case, the case holder associated therewith withdraws from the case to permit its further forward progress. Similarly, when the flap folding arms withdraw, the case holder is thrust into the next folded case for the purpose previously explained.

While the forward flap at the left-hand side of the case is bent forwardly by the arms 210, an arm 230, best seen at the extreme left of Fig. 1, is arranged to pivot to a vertical position in front of that flap to hold it in its forwardly bent position until after the case has reached the loading position. The arm 230 is pivotally mounted by a pin 231 on a supporting arm 232. As is best seen in Fig. 15 the supporting arm extends rearwardly from the arm 230 to the rearwardmost portion of the machine where it is secured to a plate 233 which is in turn secured to the sliding plate 46. Accordingly, as the sliding plate and hence an opened case are moved forwardly by the sliding plate 46 and the paddles 120, the supporting arm 232 is moved in conjunction therewith with the result that the flap holding arm 230 travels along with the opened case and may hold the forward left-hand flap in its opened position as long as the arm 230 is maintained in its vertical position. The supporting arm 232 is slidably supported by a bracket 234 secured to the left-hand rail 42.

The angular position of the arm 230 is controlled by another arm 235 also rigidly secured to the pin 231. An actuating link 236 is pivotally secured to the free-end of the arm 235 by a pin 237 and extends to the rearward portion of the machine where it engages operating apparatus provided for that purpose.

The latter apparatus includes a shaft 238 best seen in Figs. 15 and 25, which is rotatably mounted in a pair of bearings 239 and 240. The bearing 239 is secured to the rearward portion of the sliding plate 46 while the bearing 240 is secured to the rearward portion of the bracket 233. Secured to the left-hand end of the shaft 238 (the right-hand end as viewed in Fig. 25) is an arm 241 which is in turn pivotally connected to the rearward end of the operating link 236 through a pin 242.

At the other end of the shaft 238 another arm 243 is secured thereto, and, as will best be seen in Figs. 13 and 14, a link 244, pivotally connected to the arm 243 through a pin 245, extends forwardly thereof. The forward end of the link 244 is pivotally secured through a pin 246 to an arm 247 which is, in turn, secured to the shaft 121 which operates the paddles 120.

It will now be apparent that as the paddles 120 rise in preparation to driving an opened case forwardly to the case loading position, the link 240 and the link 236 will be driven forwardly with respect to the sliding plate 46 and hence with respect to the supporting arm 232. Consequently the arm 235 and the flap holding arm 230 will be driven in the clockwise direction as viewed in Fig. 1. The flap holding arm 230 will thereby be driven from its forwardly extending and substantially horizontal position to the vertical position shown in Fig. 1. Conversely when the paddles 120 drop to their lowered position, under conditions previously explained, the two links 244 and 236 will be drawn in the rearward direction and the flap holding arm 230 will pivot forwardly to a substantial horizontal position.

It is essential to the proper operation of the machine that the flap holding arm 230 remain in its vertical or flap holding position throughout the forward movement of the opened case. This permits the forward vertical flap at the left-hand side of the case to pass in front of the throat of a loading machine previously referred to but not shown in the drawings. As the paddles 120 and hence the flap holding arm 230, along with its control mechanism, begin their rearward movement it is necessary that the flap holding arm be lowered to its horizontal position promptly in order that it may not strike the bottom flap of the case last placed in loading position.

Referring to Fig. 13 it will be noted as previously explained that almost immediately upon the beginning of rearward movement of the paddles 120 the dog 124 is tripped by the trip lever 131 and the paddles 120 are permitted to assume a horizontal position as the roller 132 rolls down the forward curved portion of the rail 135. At the same time the flap holding arm 230 is rotated in a clockwise direction as viewed in Fig. 13. The position of the trip lever 131 and the slope of the forward curved portion of the rail 135 is such as to cause the flap holding arm 230 to assume its horizontal position before that arm moves rearwardly to such an extent that it would otherwise engage the lower flap at the left-hand side of the case last placed in loading position.

In accordance with the preferred embodiment of the invention all of the operating parts of the entire machine are driven from a single power source. The power source may in fact be another associated machine such as the loading machine, the conveyor apparatus which supplies the articles to be inserted in the case, or the conveyor apparatus which removes the filled cases.

In the particular machine disclosed in the drawings, power is fed to a sprocket 250, best seen in Figs. 24 and 25, for driving the entire machine. This sprocket drives a shaft 251 which also has secured thereto a double sprocket 252. A pair of chains 253 driven by the sprocket 252 engages another double sprocket 254 which is freely rotatable on a rotatable shaft 255.

Figure 26:
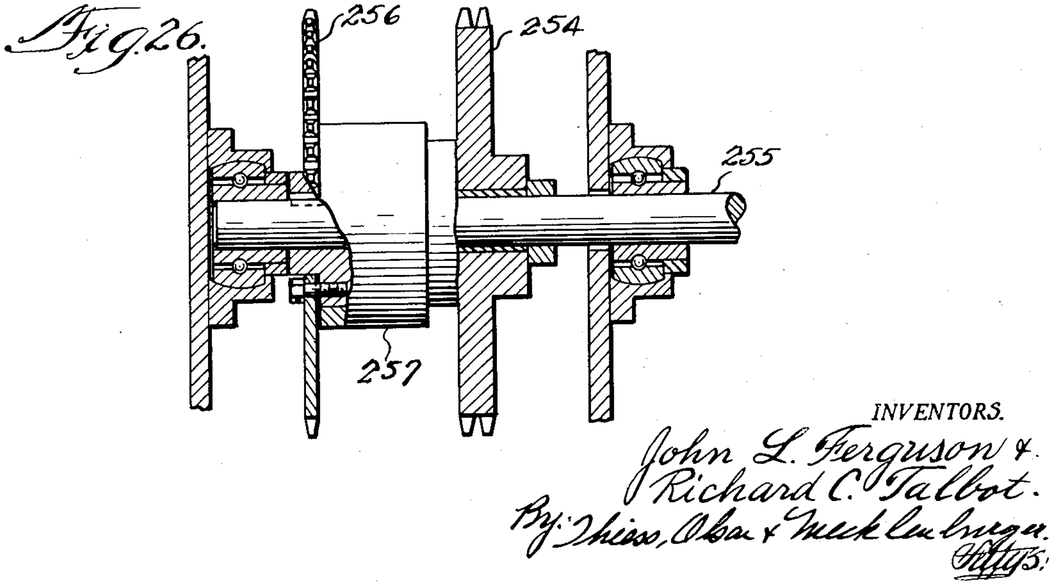
Fig. 26 is an enlarged cross-sectional view taken along the line 26—26 of Fig. 24.

The sprocket 254 is connected to a sprocket 256 through a one way clutch 257 as seen best in Fig. 26, the sprocket 256 being secured to the shaft 255. The actual construction of the clutch does not form a part of the present invention and since it may be of any suitable form, it will not be described in detail herein. It is believed to be sufficient to the purpose of this disclosure to specify that the double sprocket 254 can drive the sprocket 256 and hence the shaft 255 in one direction only. This means that if the sprocket 256 is manually driven in that same direction the clutch 257 will release with the result that the manually applied torque is not transmitted to the double sprocket 254. This arrangement is desirable in order that the functional elements of the machine may be manually driven through their various cycles and brought into proper adjustment without the necessity of mechanically disconnecting the machine from the power source.

The shaft 255 has secured thereto the cam 119 which drives the case openers 110 as previously described. Also mounted on the shaft 255 is the cam 157 which operates the forward and rearward flap closing arms 140 and 141 and the top flap lifter 142 at the right-hand side of the machine as well as the flap opener arms 210 at the left-hand side of the machine and the case holders 90 at both sides of the machine.

Another cam 105 is also mounted on the shaft 255, this cam causing operation of the case straighteners 95 as previously explained. Near the right-hand side of the machine there is still another cam 79, which drives the flap spreaders 67 through various arms and links as explained above.

The sprocket 256 is connected by a chain 258 to a sprocket 259 secured to a shaft 260. On this shaft there are also secured a pair of spur gears 261. These gears mesh respectively with gears 262 each of which is mounted on an individual stub shaft 264 as best seen in Fig. 25. In that figure it is apparent that the stub shafts have secured to their inner ends the two sprockets 61 which drive the sliding plate 46 through the chains 58 and the linkage mechanism previously described.

At the right-hand end of the shaft 260 there is secured a hand wheel 265 permitting manual driving of the machine. This hand wheel is particularly useful in adjusting the timing of the machine. When the hand wheel 265 is rotated manually in the normal or forward direction the two main shafts 260 and 255 are rotated while the one way clutch 257 slips, with the result that the power source and the interconnecting driving gear 250—254 may remain stationary.

It will be noted in Fig. 27 that a pair of idler sprockets 266 and 267 are provided for adjustably maintaining tension in the respective chains 253 and 258. The idler sprocket 267 is rotatably mounted on a stub shaft 268 which is in turn adjustably positioned in a slot 269 in the frame of the machine, a screw 270 seen in Fig. 1 being provided to lock the stub shaft 268 in a selected position in the slot. The idler sprocket 266 is rotatably mounted on a stub shaft 271 which is adjustably secured to the frame of the machine through a pivotable member 272, best seen in Fig. 2.

The sprocket 256 is shown as being substantially larger than the sprocket 259 which causes the shaft 260 to turn at a considerably higher speed than the shaft 255. The relative speeds are such that the sliding plate 46 is reciprocated through one complete cycle during each revolution of the shaft 255 with the result that all operating parts of the machine may be locked in a fixed cycle of operation.

Each of the cams 79, 157, 105 and 119 is preferably adjustably secured to the shaft 255 by any suitable form of set screw or other locking device. With this arrangement, it is possible to adjust any one of the cams with respect to the other cams and with respect to the sliding plate 46, whereby the timing of the operation of the various elements of the machine may be controlled.

The various elements of the machine now having been described in detail, it is believed that the operation of the machine will best be understood by an explanation of the passage of a single case through the machine.

A series of folded cases are first stacked in the magazine 41 with their flaps extending toward the sides of the machine. The lowermost case rests upon the two rails 42 which are depressed near the center of the magazine in order that the forward and rearward folded edges of this case may rest firmly on the rails. As the sliding plate 46 begins its forward movement the dogs 43 engage the rearward folded edge of the lowermost case. Continued forward movement of the sliding plate 46 draws this case outwardly from under the remaining folded cases in the stack. The case is moved forwardly until it strikes the case straighteners 95 which are at this time in their raised positions.

As best illustrated in Figs. 28–32, the flap spreaders 67 move downwardly from their raised positions during the latter portion of this movement of the folded case and force the two leading flaps at each side of the case downwardly such that as the case continues its forward movement the flaps are trapped beneath the rail 83 at the left-hand side of the machine and the plate 86 at the right. The two rearward flaps at each side of the case strike the sloping surfaces of the now lowered flap spreaders and are guided upwardly thereby. The two upper rearward flaps, which are the wider flaps of a rectangular case, are raised above the horizontal plane of the connected wall portion of the case by virtue of their engaging the projections 87 on the respective plates 86. V-shaped openings are thereby formed between the overlapping portions of the upper rearward and lower forward flaps. It is in this position that the forward progress of the case is halted by cessation of forward movement of the sliding plate 46 and the dogs 43.

The case holders 90 now pivot inwardly and enter the folded case through the V-shaped openings just described. The free ends of the case holders stop in a position wherein they overlie the rearward portion of the forward lower wall of the case with the rearward edge of the free end of each case holder 90 lying substantially along the scored line common to the two lower wall portions of the case. The case openers 110 now pivot upwardly and raise the lower rearward wall portion of the case. Since the case is maintained rearwardly by the case straighteners 95 and since the forward lower wall portion of the case is maintained downwardly against the rails 42 by the case holders 90 the force exerted by the case openers 110 against the lower rearward wall portion of the case opens the case. Adjacent wall portions of the case are then at right angles to each other.

The top flap lifter 142 now swings upwardly and elevates the upper flap at the right-hand side of the case. Immediately thereafter the flap folding arms 140 and 141 drive the forward and rearward flaps at the right-hand side of the machine inwardly and under the free edge of the top flap lifter to their closed positions, wherein they are held by the top flap lifter.

At substantially the same time the flap folding arms 210 at the left-hand side of the machine fold the forward flap at the left-hand side of the case forwardly to a position in which it is at substantially right angles to the associated wall portion of the case. During this folding of the various flaps the paddles 120, lying in a substantially horizontal position, have passed rearwardly under the opened case as the sliding plate 46 returns to its rearward position to permit the dogs 43 to engage and extract another folded case from the magazine 41. As the sliding plate 46 approaches its rearwardmost position, the paddles 120 emerge rearwardly from underneath the opened case and pivot upwardly by virtue of the engagement of the roller 120 with the curved rail 135. As the paddles 120 pivot upwardly the flap holding arm 230 is raised to a position where it may engage the forwardly folded forward flap at the left-hand side of the case.

During the movement of the various flap folding members toward flap folding position the case holders 90 and the case straighteners 95 are withdrawn, as previously explained, and the opened case is in condition to be advanced toward loading position. As the sliding plate 46 begins its next forward movement, in which the dogs 43 extract another folded case from the magazine 41, the paddles 120, which have now been locked in vertical position, drive the opened case forwardly along the rails 42. During this movement the lower flap at the right-hand side of the case engages the guide 193, best seen in Figs. 17 and 18, and is bent upwardly thereby to its closed position. At the left-hand side of the case the lower flap continues in engagement with the lower surface of the rail 82 while the upper flap engages the angle iron 200 and is bent slightly upwardly thereby.

Accordingly, the case reaches the loading position in opened condition, with the flaps at the right-hand end of the case closed and with the flaps at the left-hand side of the case bent outwardly in order to facilitate the entry therein of the articles to be loaded in the case. As previously mentioned the particular embodiment of the invention does not include a device for closing the upper flap at the right-hand side of the case, but this may be accomplished for example by a guide member similar to the member 193 which closes the lower flap at the right-hand side of the case during the second forward movement of the case.

It will be apparent that the invention may be varied in its physical embodiment without departing from the spirit of the invention, and it is desired, therefore, that the invention be limited only by the prior art and the scope of the appended claims.

The invention having thus been described, what is claimed and desired to be secured by Letters Patent is:

1. In a case handling machine, a reciprocating carriage, a container for receiving and holding folded cases stacked therein with the walls of said cases lying substantially horizontal, a case ejector mounted on said carriage for engaging one edge of the lowermost case in said container and for moving said case horizontally out of said container to a case opening and flap folding position when said carriage moves in one direction, a track for supporting said cases as they are removed from said container, a movable stop lever for engaging the forwardmost folded edge of each successive case after said case has been completely removed from said container by said case ejector, holding means including a movable blade-like member for entering each successive case and holding the rearward edge of the lower forward wall of said case downwardly against said track, flap spreading means including a member movable in a direction substantially normal to the plane of said flaps for bending said flaps to form a V-shaped opening as said case ejector moves successive cases toward said stop lever, stationary guide means located adjacent said track for entering and maintaining said V-shaped openings as said case ejector advances the successive cases toward said stop lever to facilitate entrance of said holding means into said case, case opening means including a pivoted arm for rotating the lower rearward side of each successive case forwardly and upwardly about the forward edge thereof, mechanical means for folding at least three of the closing flaps at one end of each successive case to closed position, mechanical means for folding the closing flaps at the other end of each successive case outwardly of the case, and case propelling means for advancing each successive case from said case opening and flap folding position to a case loading position, said last-named means being mounted on and driven by said carriage, whereby said carriage, said case ejector and said case propelling means operate simultaneously to move an opened case from said flap folding position to said case loading position and to move a succeeding folded case from said container to said case opening and flap folding position.

2. In a machine for handling folded cases, means defining a flat plane for supporting folded cases, means for advancing folded cases in file along said plane with the folds therein extending transversely of the direction of advancement and with two adjoining and substantially co-planar walls of said cases lying against said supporting means, movable stop means for temporarily engaging one folded edge of each successive folded case to prevent movement of said case in one direction along said plane, holding means including a movable member for entering said case and holding against said supporting means that one of said two adjoining walls of said case terminating at said folded edge which is temporarily engaged by said stop means, flap spreading means including a member movable in a direction substantially normal to the plane of said flaps for bending said flaps to form a V-shaped opening to facilitate entrance of said case holding means into said case, said stop means and said holding means cooperating to hold said one wall in predetermined position during a case opening operation and a flap folding operation, case opening means including a movable arm for rotating the other of said two adjoining walls of said case outwardly away from said supporting means about the common edge of said two adjoining walls, a flap lifting element pivotable with respect to said supporting means for lifting the uppermost flap at one end of said case, said element being arranged to raise said uppermost flap when said element pivots upwardly to a flap lifting position in which the free edge of said element remains below and outwardly of the folding edge of said uppermost flap, flap folding means for engaging the side flaps of said case adjacent said uppermost flap and for bending said side flaps toward closed position, means for causing upward pivotal motion of said flap lifting element to said flap lifting position, said means permitting further upward pivotal displacement of said flap lifting element by said side flaps during movement of said side flaps to closed position by said flap folding members, said means further permitting said flap lifting element to return to said flap lifting position when said side flaps have reached their closed position whereby said free edge of said element may hold said side flaps in closed position, means for folding at least one flap outwardly at the other end of said case, a flap holding member for holding said outwardly bent flap in outwardly bent position, case propelling means for advancing said opened case from said case opening and flap folding position to a case loading position, said flap holding member being associated with said case propelling means and movable therewith whereby said flap holding member may hold said outwardly bent flap in outwardly bent position during the movement of said case from said flap folding position to said case loading position, and guide means secured to said supporting means and so shaped and positioned as to close the lowermost flap of said case adjacent said side flaps as said case is advanced by said case propelling means, said lowermost flap being at least partially closed thereby prior to disengagement of either of said side flaps from said free edge of said flap lifting element as said case is advanced.

3. In a case handling machine, a reciprocating carriage, a container for receiving and holding folded cases stacked therein with the walls of said cases lying substantially horizontal, a case ejector mounted on said carriage for engaging one edge of the lowermost case in said container and for moving said case horizontally out of said container to a case opening and flap folding position when said carriage moves in one direction, a track for supporting said cases as they are removed from said container, a movable stop lever for engaging the forwardmost folded edge of each successive case after said case has been completely removed from said container by said case ejector, holding means including a movable blade-like member for entering each successive case and holding the rearward edge of the lower forward wall of said case downwardly against said track, flap spreading means including a member movable in a direction substantially normal to the plane of said flaps for bending said flaps to form a V-shaped opening to facilitate entrance of said holding means into said case, case opening means including a pivoted arm for rotating the lower rearward side of each successive case forwardly and upwardly about the forward edge thereof, a pivotable flap lifting element for lifting the uppermost flap at one end of said case, said element being arranged to raise said uppermost flap when said element pivots upwardly to a flap lifting position in which the free edge of said element remains below and outwardly of the folding edge of said uppermost flap, flap folding means for engaging the side flaps of said case adjacent said uppermost flap and for bending said side flaps toward closed position, means for causing upward pivotal movement of said flap lifting element to said flap lifting position, said means permitting further upward pivotal displacement of said flap lifting element by said side flaps during movement of said side flaps to closed position by said flap holding members, said means further permitting said flap lifting element to return to said flap lifting position when said side flaps have reached their closed position whereby the free edge of said element may hold said side flaps in closed position, means for folding at least one flap outwardly at the other end of said case, a flap holding member for holding said outwardly bent flap in outwardly bent position, case propelling means for advancing each successive case from said case opening and flap folding position to a case loading position, said last-named means being mounted on and driven by said carriage, whereby said carriage, said case ejector and said case propelling means operate simultaneously to move an opened case from said flap folding position to said case loading position and to move a succeeding folded case from said container to said case opening and flap folding position, said flap holding member also being mounted on said carriage whereby said flap holding member may hold said outwardly bent flap in outwardly bent position during the movement of each successive case from said flap folding position to said case loading position, and guide means secured to said track and so shaped and positioned as to close the lowermost flap of each successive case adjacent said side flaps as said case is advanced by said case propelling means, said lowermost flap being at least partially closed thereby prior to disengagement of either of said side flaps from said free edge of said flap lifting element as said base is advanced from said case folding position.

4. In a case handling machine, a reciprocating carriage, a container for receiving and holding folded cases stacked therein with the walls of said cases lying substantially horizontal, a case ejector mounted on said carriage for engaging one edge of the lowermost case in said container and for moving said case horizontally out of said container to a case opening and flap folding position when said carriage moves in one direction, a track for supporting said cases as they are removed from said container, a movable stop lever for engaging the forwardmost folded edge of each successive case after said case has been completely removed from said container by said case ejector, holding means including a movable blade-like member for entering each successive case and holding the rearward edge of the lower forward wall of said case downwardly against said track, flap spreading means including a member movable in a direction substantially normal to the plane of said flaps for bending said flaps to form a V-shaped opening to facilitate entrance of said holding means into said case, case opening means including a pivoted arm for rotating the lower rearward wall of each successive case forwardly and upwardly about the forward edge thereof, a pivotable flap lifting element for lifting the uppermost flap at one end of said case, said element being arranged to raise said uppermost flap when said element pivots upwardly to a flap lifting position in which the free edge of said element remains below and outwardly of the folding edge of said uppermost flap, flap folding means for engaging the side flaps of said case adjacent said uppermost flap and for bending said side flaps toward closed position, means for causing upward pivotal movement of said flap lifting element to said flap lifting position, said means permitting further upward pivotal displacement of said flap lifting element by said side flaps during movement of said side flaps to closed position by said flap folding members, said means further permitting said flap lifting element to return to said flap lifting position when said side flaps have reached their closed position whereby the free edge of said element may hold said side flaps in closed position, means for folding at least one flap outwardly at the other end of said case, a flap holding member for holding said outwardly bent flap in outwardly bent position, case propelling means for advancing each successive case from said case opening and flap folding position to a case loading position, said last-named means being mounted on and driven by said carriage, whereby said carriage, said case ejector and said case propelling means operate simultaneously to move an opened case from said flap folding position to said case loading position and to move a succeeding folded case from said container to said case opening and flap folding position, said flap holding member also being mounted on said carriage whereby said flap holding member may hold said outwardly bent flap in outwardly bent position during the movement of each successive case from said flap folding position to said case loading position, guide means secured to said track and so shaped and positioned as to close the lowermost flap of each successive case adjacent said side flaps as said case is advanced by said case propelling means, said lowermost flap being at least partially closed thereby prior to disengagement of either of said side flaps from said free edge of said flap lifting element as said case is advanced from said case folding position, and common drive means for positively driving the various movable elements of said machine including said reciprocating carriage whereby said movable elements are locked in a fixed cycle of operation, said drive means having adjustable connection to the various ones of said movable elements whereby the relative timing of the elements may be adjusted.

References Cited in the file of this patent

UNITED STATES PATENTS

| | | |
|---|---|---|
| 804,716 | Gay | Nov. 14, 1905 |
| 1,289,673 | Cooper | Dec. 31, 1918 |
| 1,376,499 | Anderson | May 3, 1921 |
| 1,494,977 | Rose | May 20, 1924 |
| 1,559,707 | Jones | Nov. 3, 1925 |
| 1,765,416 | La Bombard | June 24, 1930 |
| 1,935,269 | Jones | Nov. 14, 1933 |
| 2,241,817 | Howard | May 13, 1941 |
| 2,252,845 | Gantzer | Aug. 19, 1941 |
| 2,280,773 | Ferguson | Apr. 28, 1942 |
| 2,336,507 | Shields | Dec. 14, 1943 |
| 2,364,868 | Monroe | Dec. 12, 1944 |
| 2,410,393 | Rines | Oct. 29, 1946 |
| 2,541,914 | Conser | Feb. 13, 1951 |